(12) United States Patent
Miñano et al.

(10) Patent No.: US 8,035,898 B2
(45) Date of Patent: Oct. 11, 2011

(54) IMAGING OPTICS DESIGNED BY THE SIMULTANEOUS MULTIPLE SURFACE METHOD

(75) Inventors: Juan Carlos Miñano, Madrid (ES); Pablo Benítez, Madrid (ES); Fernando Muñoz, Madrid (ES)

(73) Assignee: LPI-Europe, S.L., Pozuelo, Madrid (ES)

( * ) Notice: Subject to any disclaimer, the term of this patent is extended or adjusted under 35 U.S.C. 154(b) by 112 days.

(21) Appl. No.: 12/462,680

(22) Filed: Aug. 7, 2009

(65) Prior Publication Data

US 2010/0042363 A1    Feb. 18, 2010

Related U.S. Application Data

(60) Provisional application No. 61/188,449, filed on Aug. 8, 2008.

(51) Int. Cl.
*G02B 3/00* (2006.01)
*G02B 17/00* (2006.01)

(52) U.S. Cl. ................ 359/642; 359/726; 359/728

(58) Field of Classification Search .............. 359/642, 359/708–728; 264/1.1
See application file for complete search history.

(56) References Cited

U.S. PATENT DOCUMENTS

| | | | | |
|---|---|---|---|---|
| 6,639,733 | B2 * | 10/2003 | Minano et al. | 359/728 |
| 6,896,381 | B2 | 5/2005 | Benitez et al. | 359/858 |
| 7,826,142 | B2 * | 11/2010 | Harned et al. | 359/642 |
| 2005/0086032 | A1 | 4/2005 | Benitez et al. | 703/1 |

* cited by examiner

*Primary Examiner* — Mohammed Hasan
(74) *Attorney, Agent, or Firm* — Drinker Biddle & Reath LLP

(57) ABSTRACT

One embodiment of a method of calculating an optical surface comprises calculating a meridional optical line of the surface. A ray is selected that passes a known point defining an end of a part of the optical line already calculated. The optical line is extrapolated from the known point to meet the ray using a polynomial with at least one degree of freedom. The polynomial is adjusted as necessary so that the selected ray is deflected at the extrapolated optical line to a desired target point. The polynomial is added to the optical line up to the point where the selected ray is deflected. The point where the selected ray is deflected is used as the known point in a repetition of those steps.

19 Claims, 25 Drawing Sheets

FIG. 39C
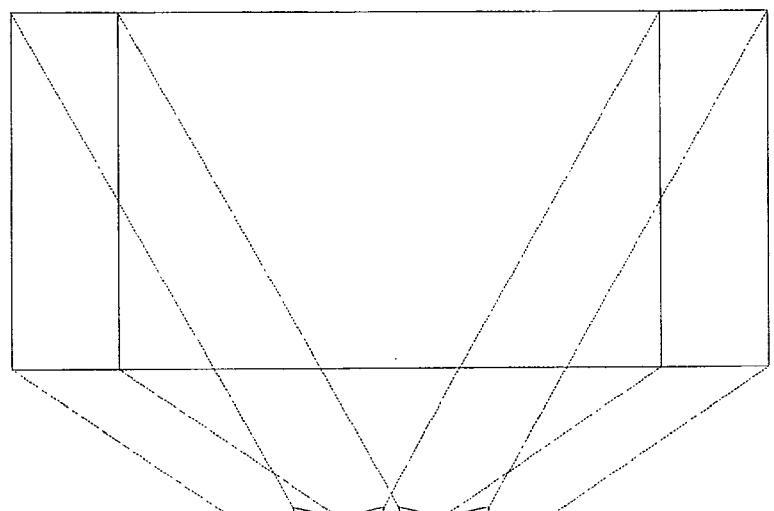
3901
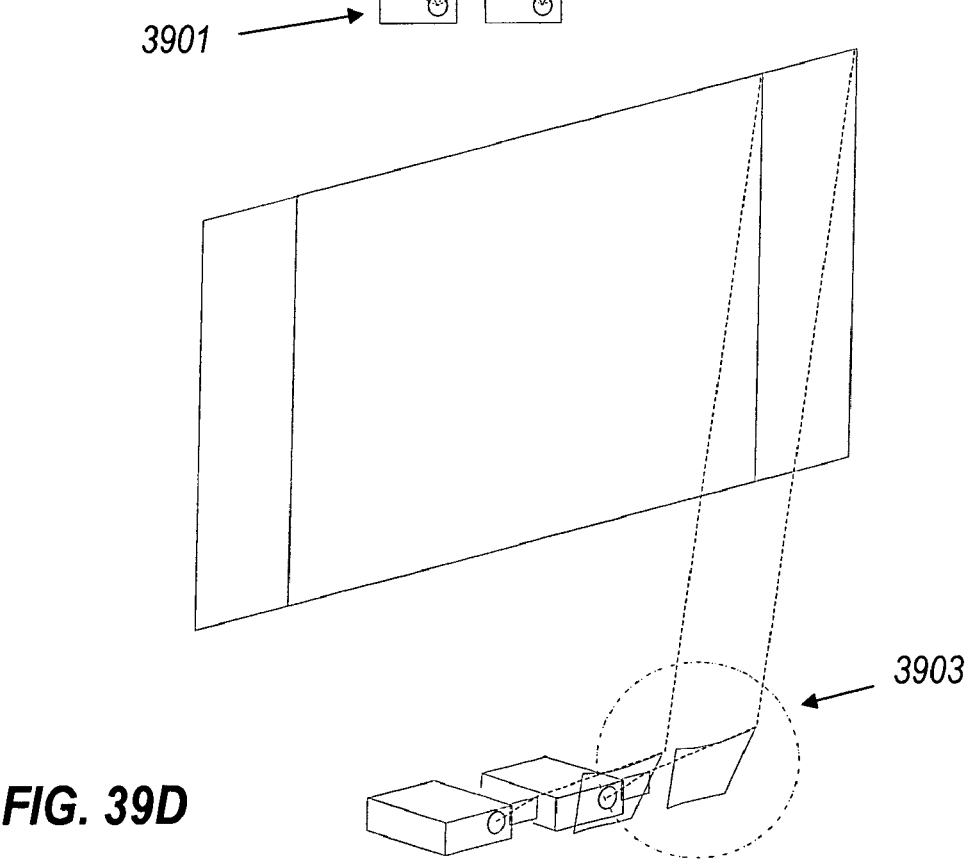
3903
FIG. 39D

FIG. 41A
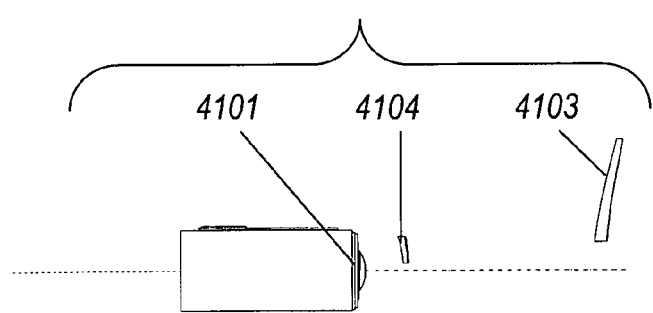
FIG. 41B
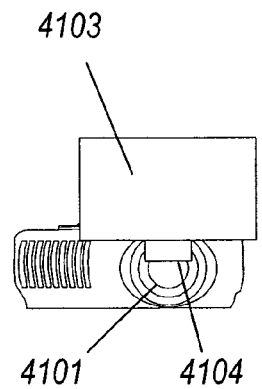
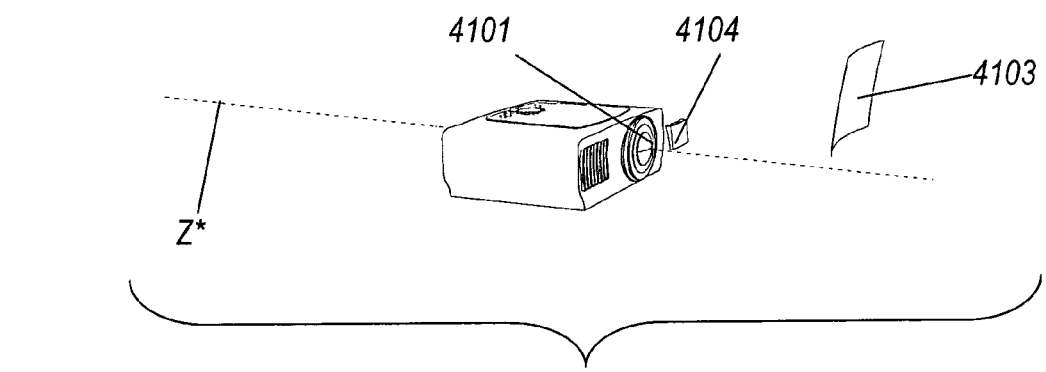
FIG. 41C

ND SIMULTANEOUS MULTIPLE SURFACE METHOD

IMAGING OPTICS DESIGNED BY THE SIMULTANEOUS MULTIPLE SURFACE METHOD

CROSS REFERENCE TO RELATED APPLICATIONS

This application claims benefit of U.S. Provisional Patent Application No. 61/188,449, filed 8 Aug. 2008 by Miñano et al., which is incorporated herein by reference in its entirety.

TECHNICAL FIELD

The present invention relates generally to image-forming optics.

BACKGROUND

The design of imaging optics is a centuries-old art with literally thousands of inventions in the prior art. Nearly all of these are combinations of flats and spherical surfaces, due to their relative ease of manufacture. Surfaces with substantial departure from sphericity are known as aspherics, but aside from known quartic shapes such as the ellipsoid and the paraboloid there was little use of aspheres until the twentieth century, when advances both in theory and fabrication technology brought them into prominence. Aspheric surfaces can advantageously substitute for multiple spherical surfaces, resulting in less costly devices, even if a single asphere is more costly than a sphere. With the advent of injection-molded plastic optics and precision molded glass optics, aspheres entered the optical-technology mainstream.

Applications of aspheric optics fall into two categories, imaging and non-imaging. Non-imaging optics is concerned with illumination and the distribution of optical power, with the defining constraint being the behavior of only the outermost rays (called edge rays) of a flux distribution. Imaging optics, however, is concerned with the spatial modulation of flux, with the goal of reproducing a particular flux distribution (the object) at another location (the image). Nonimaging optical design need only take care of the edge rays, a relatively small portion of all rays, but an imaging system must send all rays to their appropriate destination, parameterized by the system magnification m. A ray originating at coordinate point (x,y) on the object must arrive at the image coordinate (mx, my), known as the image-mapping requirement. In the real world of imaging each point on the object typically radiates flux in all forward directions (i.e., nearly hemispherically) and practicality demands that a significant percentage of this flux reach the proper image point, with little or none going anywhere else on the image plane, once it enters the optical system aperture. In the world of theory, however, many aspheric design procedures hold only when rays hitting a surface subtend only a small solid angle, near the surface normal, and relatively parallel to the optical axis. This enables approximate aberration coefficients to be rapidly calculated for aspheric surfaces in design optimization.

Attaining perfect image mapping for every object point would theoretically require an infinite number of surfaces, but with a limited number of surfaces, state of the art techniques define a merit function to evaluate deviations from ideal imaging in order to minimize loss of image formation over sampled points of the image plane.

A general difficulty with aspherics is that they generally do not have a closed form solution for ray intersections, unlike the algebraic ease with which intersections are calculated for flats, spheres, and the other quadric surfaces (torus, cylinder, ellipsoid, paraboloid, hyperboloid), enabling optimal designs to be derived just with a formula. Aspheres in general, however, generally require a computationally intense iterative search that closes in on the precise intersection.

State of the art imaging optics design is done via optimization techniques using a parametric representation of a selected group and type of optical surfaces. A merit function of those parameters is defined and the search for the optimum of the merit function is done by a computer-aided multiple-parameter algorithm. The implementation of this algorithm may be based on different techniques, as binned least-square methods, simulated annealing, genetic algorithms, etc. However, the differentiation between local and global optimum is not guaranteed, and the optimization depends for its success upon the particular mathematical representation chosen to specify the surfaces. Moreover, usually the optimum found is not too far from the initial guess of the designer, so solutions far from that guess are not accessible in practice. In this application some of the embodiments refer to wide angle projection optics using one mirror. Devices for such an application also including mirrors are disclosed in prior art patents as U.S. Pat. Nos. 6,771,427 and 6,612,704 and US Patent Application No. 2001/0050758 A1. All of them have been obtained by the use of standard optimization procedures.

The only cases in prior art where no optimization is done are based on problems stated in terms of ordinary differential equations. This is the case of the single surface designs to provide axial stigmatism (that is, correction of spherical aberration of all orders), as Cartesian ovals or Schmidt correctors, and the case of the two aspheric surface aplanatic designs, as those by Schwarzschild in 1905 for 2 mirrors (see Born & Wolf, *Principles of Optics*, p. 168).

Earlier versions of a simultaneous multiple surface (SMS) method for designing optical devices were disclosed in U.S. Pat. Nos. 6,639,733 and 6,896,381 and US Patent Application No. 2005/0086032. This design method generates surfaces locally, based on their refraction of the relevant rays incident upon them. However, the earlier versions of the SMS method disclosed in those patent documents were directed to non-imaging optics and for rotationally symmetrical optics they are restricted to the use of meridional rays, while the present application discloses constructive methods using skew rays.

SMS methods for designing imaging optics were discussed in published reports on two projects: "Televisión por proyección ultra-delgada de pantalla grande y alta resolución" (Television by ultra-thin, high-resolution projection on a large screen) (Financer Entity: Ministerio de Ciencia y Tecnología [Ministry of Science and Technology of the Kingdom of Spain] referencia TIC2001-3617-C02) and "Sistemas ópticos avanzados para displays de proyección (Advanced optical systems for projection displays)" (Financer Entity: Ministerio de Ciencia y Tecnología [Ministry of Science and Technology of the Kingdom of Spain] referencia TEC2004-04316), as well as the doctoral thesis "Sistemas ópticos avanzados de gran compatibilidad con aplicaciones en formación de imagen y en iluminación" (Ultra-compact advanced optical systems for image formation and illumination applications), all by: Fernando Muñoz and Pablo Benítez. These concepts comprise procedures to design optical devices for imaging applications, particularly wide angle projectors.

However, those previous publications by Dr. Muñoz and Benitez do not disclose good calculation procedures for the application of the SMS-imaging design method, particularly no constructional algorithm for skew rays has hitherto been published. Therefore, a skilled person in the field cannot reproduce the designs from the aforementioned publications by Dr. Muñoz and Pablo Benitez. Additionally, the designs in those previous publications did not consider the possibility of both the object and the input pupil being decentered relative to the optical axis of the optical surfaces to be designed, while the present application does address that possibility. This case is valuable, particularly in mirror based designs, to solve problems of shading and obstruction in practical cases.

SUMMARY OF THE INVENTION

The present invention relates generally to image-forming optics and more particularly to external aspheric optical mirrors to be adapted to an existing commercial projector. The preferred embodiments disclosed herein of the present invention were generated by a new version of the simultaneous multiple surface (SMS) method, which is capable to calculate directly multiple rotational aspheric surfaces without restriction on their asphericity.

Embodiments of the present invention allow designing with the SMS not only with meridian rays but with skew rays. An advantage of designing with skew rays or a combination of meridian and skew rays is that the design ray bundles can be equispaced in the phase space, which allows a higher control of the imaging quality.

Embodiments of the present invention make it possible to design imaging devices with the following specific configurations among others (where R denotes a refractive surface and X denotes a reflective surface):

XX off axis (application: wide angle projection);
RRX off axis (application: wide angle projection);
RXXR off axis (application: binoculars);
XX on axis (application: compact lens with large focal length);
RXXR on axis (application: compact lens with large focal length).

According to an embodiment of the invention, there is provided a method of calculating an optical surface. A meridional optical line of the surface is calculated by repeatedly: selecting a ray passing a known point defining an end of a part of the optical line already calculated; extrapolating the optical line from the known point to meet the ray using a polynomial with at least one degree of freedom; adjusting the polynomial as necessary so that the selected ray is deflected at the extrapolated optical line to a desired target point; adding the polynomial to the optical line up to the point where the selected ray is deflected; and using said point where the selected ray is deflected as the known point in the next repetition.

According to another of the invention, there is provided a method of calculating first and second circularly symmetrical optical surfaces centered on an optical axis, comprising repeatedly: selecting a skew ray passing a part of the first optical surface already calculated; extrapolating the first optical surface to meet the ray at a first point; selecting a surface direction for the extrapolated first optical surface at the first point having a normal in a meridional plane; continuing the skew ray, deflected as implied by the selected normal, to a second point on the second optical surface, extrapolated as necessary; finding a surface direction at the second point so that the selected ray is deflected at the second point to a desired target point; adjusting the surface direction at the first point as necessary so that the normal to the surface direction at the second point is in a meridional plane; adding the extrapolated parts as far as the first and second points to the first and second optical surfaces with the determined surface directions; and using said added parts as the known parts in the next repetition.

According to a further embodiment of the invention, there is provided a method of designing a plurality N of optical surfaces of an optical system without requiring subsequent optimization methods, wherein the N optical surfaces are aspheric surfaces of rotation without restriction on their asphericity, comprising: simultaneously calculating the N surfaces point-by-point; using N uniparametric ray bundles previously selected at a starting position of the system; and applying the condition that the N uniparametric ray bundles are imaged without ray-aberration.

According to other embodiments of the invention, there are provided pluralities of optical surfaces designed or designable by the methods of the invention, optical systems comprising such pluralities of surfaces, and projectors, projection systems, and other apparatuses including such optical systems.

According to another embodiment of the invention, there are provided methods of manufacturing optical systems and apparatuses including such optical systems, comprising designing a plurality of optical surfaces in accordance with the methods of the invention and manufacturing one or more elements having optical surfaces in accordance with the design.

BRIEF DESCRIPTION OF THE DRAWINGS

The above and other aspects, features and advantages of the present methods will be more apparent from the following more particular description thereof, presented in conjunction with the following drawings wherein:

FIG. 39C is a front view of another embodiment of a two-projector system.

FIG. 39D is a perspective view of the system of FIG. 39C.

FIG. 41A is a side view of the projector, lens and mirror of an RRX system such as those shown in FIGS. 39A to 39D, to a larger scale than FIG. 39A.

FIG. 41B is a front view of the elements shown in FIG. 41A.

FIG. 41C is a perspective view of the elements shown in FIG. 41A.

DETAILED DESCRIPTION OF THE DRAWINGS

Figure 1:
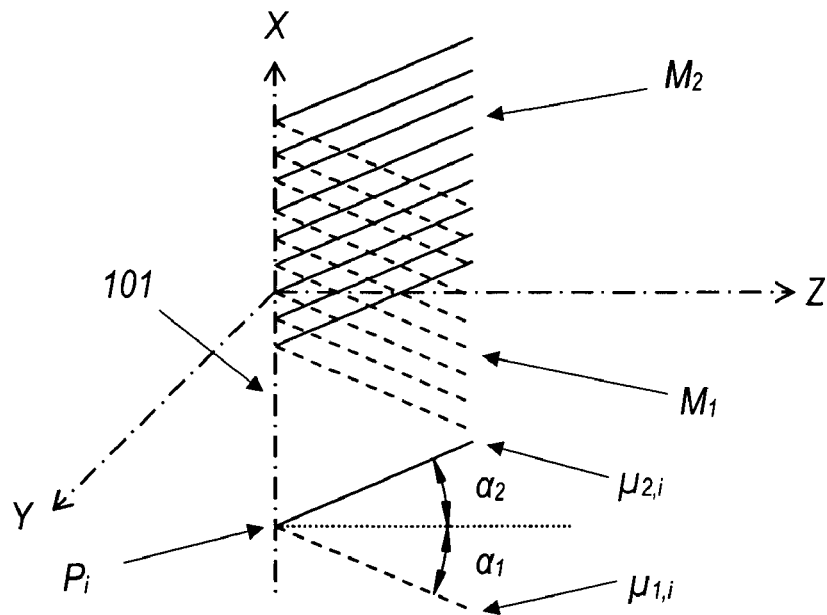
FIGS. 1 to 7 are ray diagrams for examples of bundle definitions.

A better understanding of the features and advantages of the present methods will be obtained by reference to the following detailed description of the invention and accompanying drawings, which set forth illustrative embodiments in which certain principles are used. They show various optical surfaces delineating transparent solids of one or more refractive indices, all in these embodiments known beforehand. These solids and their indices are implied in these Figures, though for the sake of clarity not all shown in full. In addition to the usual reference numerals some, but in the interests of clarity not all, of the alphanumeric algebraic symbols used in the present specification are shown in the drawings.

In contrast to the prior art methods, design methods described herein are capable of directly calculating multiple rotational aspheric surfaces without restriction on their asphericity. The design procedure involves the simultaneous point-by-point calculation of N rotationally symmetric aspheric surfaces with the condition that N uniparametric ray bundles (previously selected by the designer at the input side) are perfectly imaged (no ray-aberration for those rays). Each bundle can be described by expressions such as $x=x(t, \xi)$, $y=y(t, \xi)$, $z=z(t, \xi)$, where t is the parameter along the ray trajectory and $\xi$ is the parameter of the bundle. For each value of $\xi$, this expression defines a straight line (a light ray trajectory).

One design strategy described herein consists in selecting the uniparametric ray bundles at the input so that a proper sampling of the phase space (i.e., spatial-angular space) at the object and entry pupil is produced, expecting that the perfect image quality for those rays will provide sufficient image quality of the remaining rays by proximity. In general, how the bundle of rays must be at the output side is not known in advance, but it is determined as they are calculated during the design, as a result of imposing the condition of zero ray-aberration for the selected rays. The selection of the ray bundles for the design is done by the designer to better suit a specific design problem.

For the more general case of bundle selection, it is useful to consider that a rotationally symmetric optical system defines the usual three independent variables $(r,\rho,\phi)$, and one independent ray can be represented as one point of that 3D-space $r$-$\rho$-$\phi$, where r is the radius of the point at which the ray crosses the object plane, $\rho$ is the radius of the point at which the ray crosses the entry pupil, and $\phi$ is the difference in azimuth about the optical axis of those two points. Each point in the $r$-$\rho$-$\phi$ space thus defines a ring of equivalent rays Additionally, due to the symmetry, the ray at $(r,\rho,\phi)$ is redundant with the ray at $(r,\rho,-\phi)$, one ray being a symmetrical image of the other in a meridional plane, In the case where the pupil is located at infinity (telecentric pupil), or the object is located at infinity, the same considerations apply, but the variable p of the ray at the pupil or the variable r of the ray at the object, respectively, must be replaced by the angle formed by the ray with the optical axis z.

In one implementation the object and entry pupil define a volumetric region of that $r$-$\rho$-$\phi$ space. Each uniparametric ray bundle describes a curve in that 3D space $r$-$\rho$-$\phi$. The selection of the N uniparametric bundles for the proper sampling of the phase space referred before is done by choosing those curves so they fill the volume defined by the object and the entry pupil, and the distance between the curves is rather constant.

For the definition of such a distance, a metric in the $r$-$\rho$-$\phi$ space is needed, for instance, the one usually employed in ray-tracing through imaging optical systems, for which equally spaced object points (r variable) and equally spaced points in the pupil (for which $\rho,\phi$ are the polar coordinates) are considered evenly spaced. Therefore, this metric in the 3D space $r$-$\rho$-$\phi$ is given by the differential of length $ds^2=dr^2+d\rho^2+\rho^2 d\phi^2$. Two extreme cases of uniparametric ray bundle selections are of particular interest. One of them occurs when the object is small compared to the input pupil, and for this case the ray bundles can be selected such that the N uniparametric ray bundles depart from N different points rather evenly spaced inside the object. In the dual case in which the input pupil is small compared to the object, the ray bundles can be selected such that the N uniparametric ray bundles point towards N different points evenly spaced inside the pupil. These two cases can be referred to as object and pupil discretization, respectively.

For this purpose, a "small" pupil or object is one that can be well approximated by a low-order truncation of the power series expansion in the variable $\rho$ or r, respectively of the Wavefront Aberration Function W. W is usually expressed with the variables $r$-$\rho$-$\phi$. In the case of a pupil at infinity, $\rho$ is not an appropriate variable, and W is studied using instead the variables $r$-$\theta$-$\phi$, where $\theta=\arctan \rho/z_{pupil}$. A "small" pupil is then one for which $W(r, \theta, \phi)$ can be well approximated by a low-order polynomial in $\theta$, with r and $\phi$ appearing as coefficients. In the case of an object at infinity, W is similarly redefined as $W(\theta, \rho, \phi)$ where $\theta=\arctan r/z_{pupil}$, and a "small" object is one for which $W(\theta, \rho, \phi)$ can be well approximated by a low-order polynomial in $\theta$.

FIGS. 1 to 7 show examples of different types of bundles of rays at the object side that will be referred in the following figures. All of these bundles of rays are uniparametric sets of meridional or skew rays. These bundles constitute an example of input pupil discretization at the object side (all rays in each ray bundle point to different points of the pupil). For greater clarity in the explanations, the pupil is located at infinity in these FIGS. (so the system is telecentric at the object side) and thus all the rays belonging to one bundle are parallel.

FIG. 1 shows two bundles of meridional rays that are contained in the XZ plane, where the Z axis is the optical axis of the system. Bundle $M_1$ is composed by rays (shown by dashed lines, e.g. ray $\mu_{1,i}$) exiting from points (e.g. $P_i$) in the object plane 101 along the X-axis and forming an angle $\alpha_1$ with the optical axis Z. Bundle $M_2$ is composed by rays (shown by continuous lines, e.g. ray $\mu_{2,i}$) exiting from points (e.g. $P_i$) in the object plane 101 along the X-axis and forming an angle $\alpha_2$ with the optical axis Z.

Figure 2:
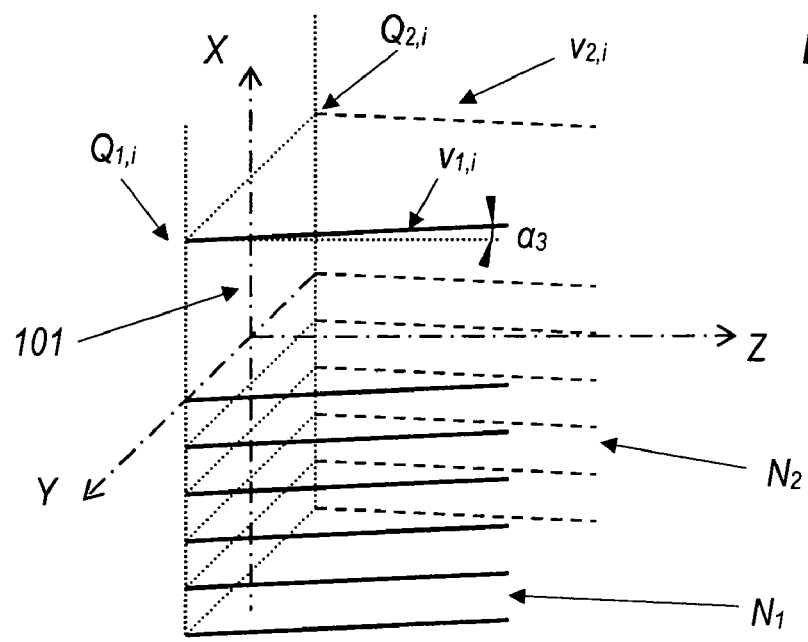

FIG. 2 shows two bundles of skew rays, bundles $N_1$ and $N_2$. Bundle $N_1$ is composed by rays (e.g. $v_{1,i}$) contained in planes parallel to the YZ plane, exiting from points (e.g. $Q_i$) along a line parallel to the X-axis in the object plane (XY plane) 101. The rays of bundle $N_1$ form an angle $\alpha_3$ with lines parallel to the optical axis Z. Bundle $N_2$ is symmetrical to bundle $N_1$ with respect to the XZ plane. It will be seen that each of the bundles $N_1$ and $N_2$ contains one ray, in the YZ plane, that is in fact meridional. In general, in a "bundle of meridional rays" all the rays are meridional. In general, in a "bundle of skew rays" typically one special ray is meridional, and all the other rays are strictly skew.

Figure 3:
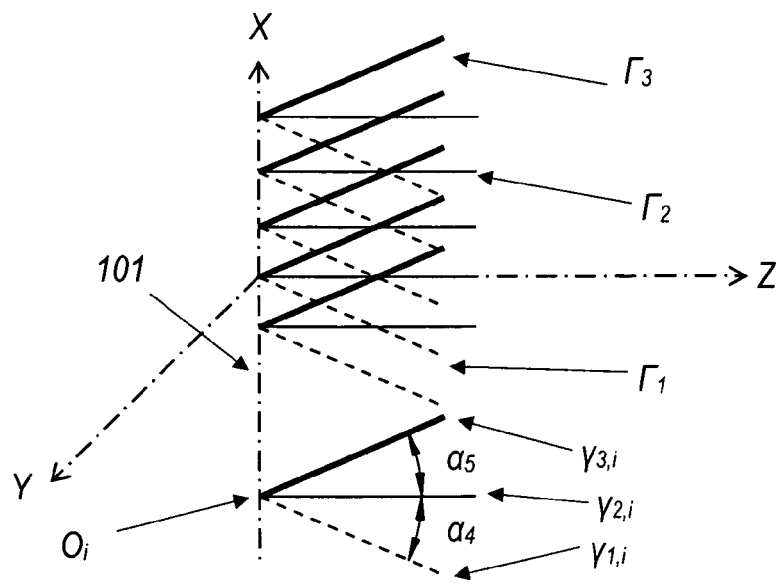

FIG. 3 shows three bundles of meridional rays that are contained in the plane XZ. Bundle $\Gamma_1$ is composed by rays (shown by dashed lines, e.g. ray $\gamma_{1,i}$) exiting from points (e.g. $O_i$) in the object plane 101 along X-axis and forming an angle $\alpha_4$ with the optical axis Z. Bundle $\Gamma_2$ is composed by rays (shown by thin solid lines, e.g. ray $\gamma_{2,i}$) parallel to the optical axis Z exiting from points (e.g. $O_i$) in the object plane 101 along X-axis. Bundle $\Gamma_3$ is composed by rays (shown by thick solid lines, e.g. ray $\gamma_{3,i}$) exiting from the points $O_i$ in the object plane 101 along the X-axis and forming an angle as with the optical axis Z.

Figure 4:
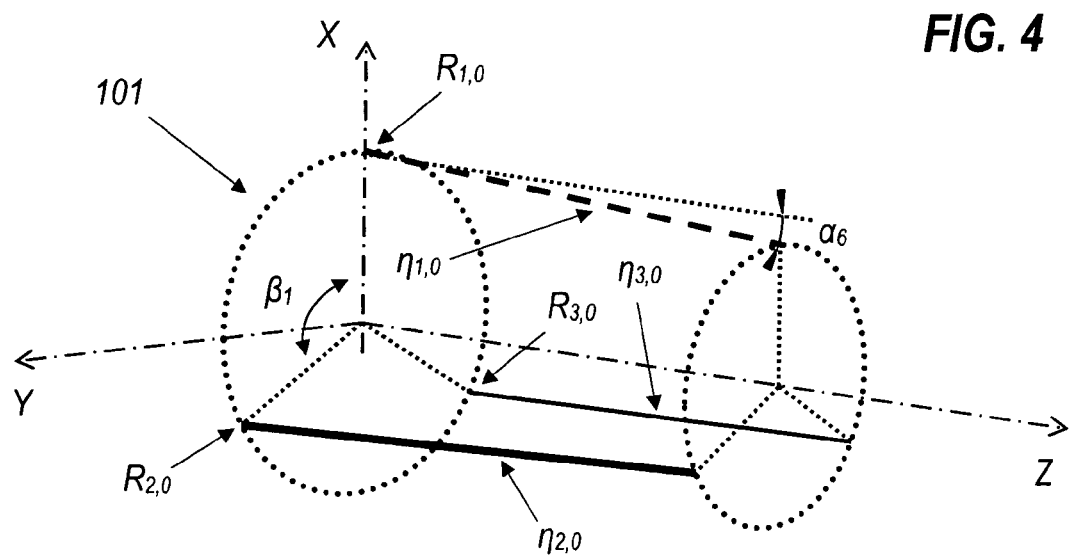

FIG. 4 shows the initial step to define one uniparametric bundle of meridional rays and two uniparametric bundles of skew rays. Ray $\eta_{1,0}$ is a meridional ray contained in plane XZ, exiting from a point ($R_{1,0}$) in the object plane 101 and forming an angle $\alpha_6$ with the optical axis Z. Rays $\eta_{2,0}$ and $\eta_{3,0}$ are also meridional. Ray $\eta_{2,0}$ is obtained by rotating the ray $\eta_{1,0}$ around the optical axis Z an angle $\beta_1$. Ray $\eta_{3,0}$ is symmetrical to ray $\eta_{2,0}$ with respect to plane XZ.

Figure 5:
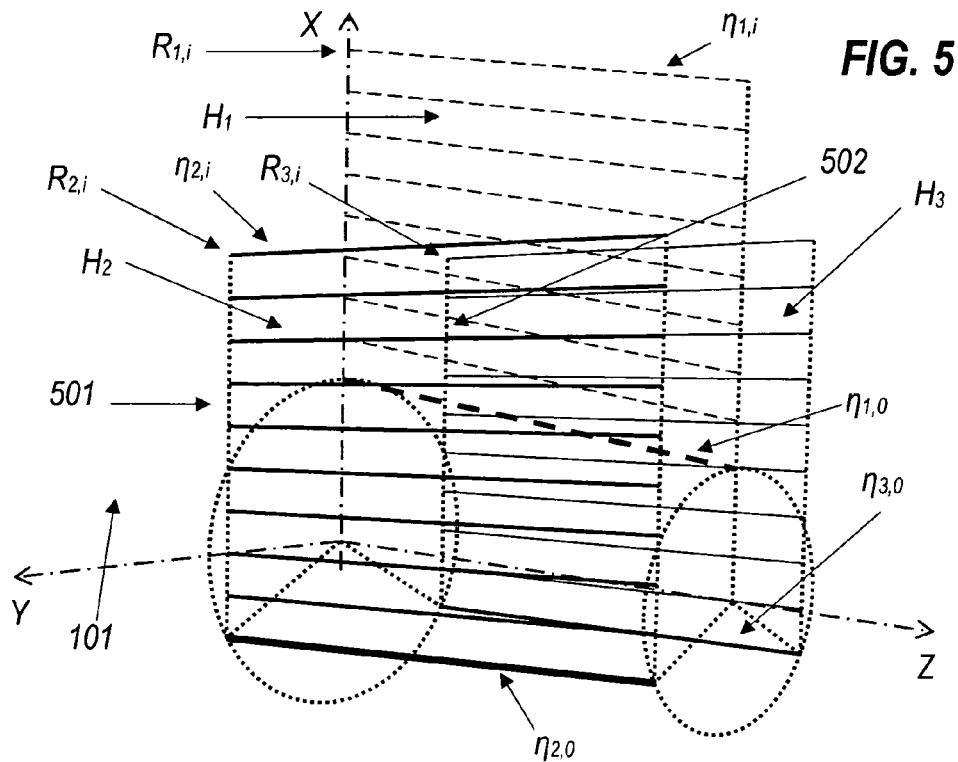

FIG. 5 shows the second step to define one uniparametric bundle of meridional rays and two uniparametric bundles of skew rays. Bundle $H_1$ is composed of rays (e.g. $\eta_{1,i}$) exiting from points (e.g. $R_{1,i}$) in the object plane 101 along the X-axis and parallel to ray $\eta_{1,0}$ described in FIG. 4. Bundle $H_2$ is composed of rays (e.g. $\eta_{2,i}$) that are parallel to ray $\eta_{2,0}$ described in FIG. 4 and exit from points (e.g. $R_{2,i}$) in the object plane 101 along a line 501 that is parallel to the X axis and intersects ray $\eta_{2,0}$, so that ray $\eta_{2,0}$ is a special ray of Bundle $H_2$. Bundle $H_3$ is symmetrical to bundle $H_2$ with respect to plane XZ.

Figure 6:
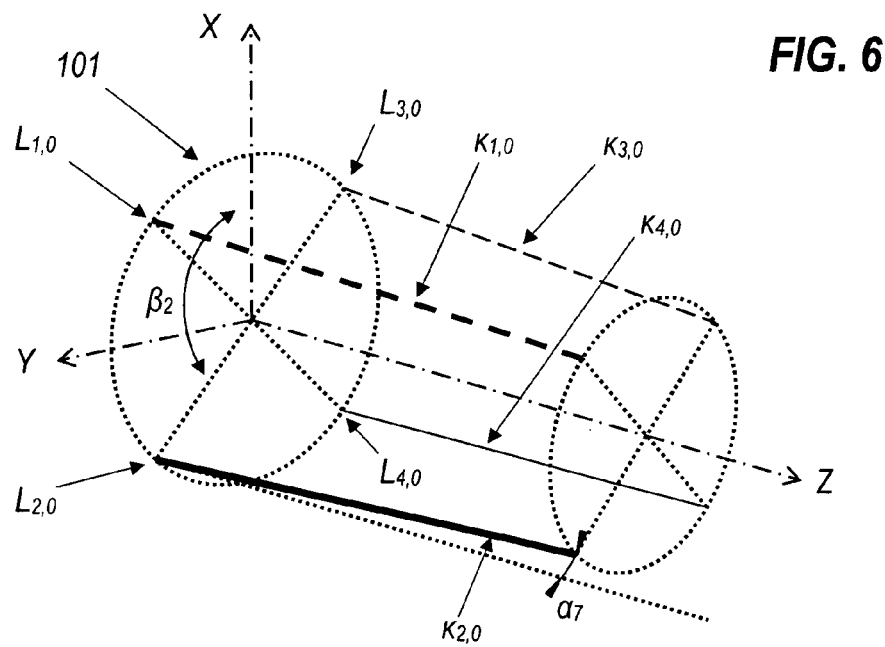

FIG. 6 shows an example to understand the definition of four bundles of skew rays. Ray $\kappa_{2,0}$ is a meridional ray contained in a meridional plane that is rotated an angle $\beta_2$ about the Z axis with respect to plane XZ, exiting from a point ($L_{2,0}$) in the object plane 101 and forming an angle $\alpha_7$ with the optical axis Z. Ray $\kappa_{1,0}$ is symmetrical to ray $\kappa_{2,0}$ with respect to plane YZ. Rays $\kappa_{3,0}$ and $\kappa_{4,0}$ are, respectively, symmetrical to rays $\kappa_{1,0}$ and $\kappa_{2,0}$ with respect to plane XZ.

Figure 7:
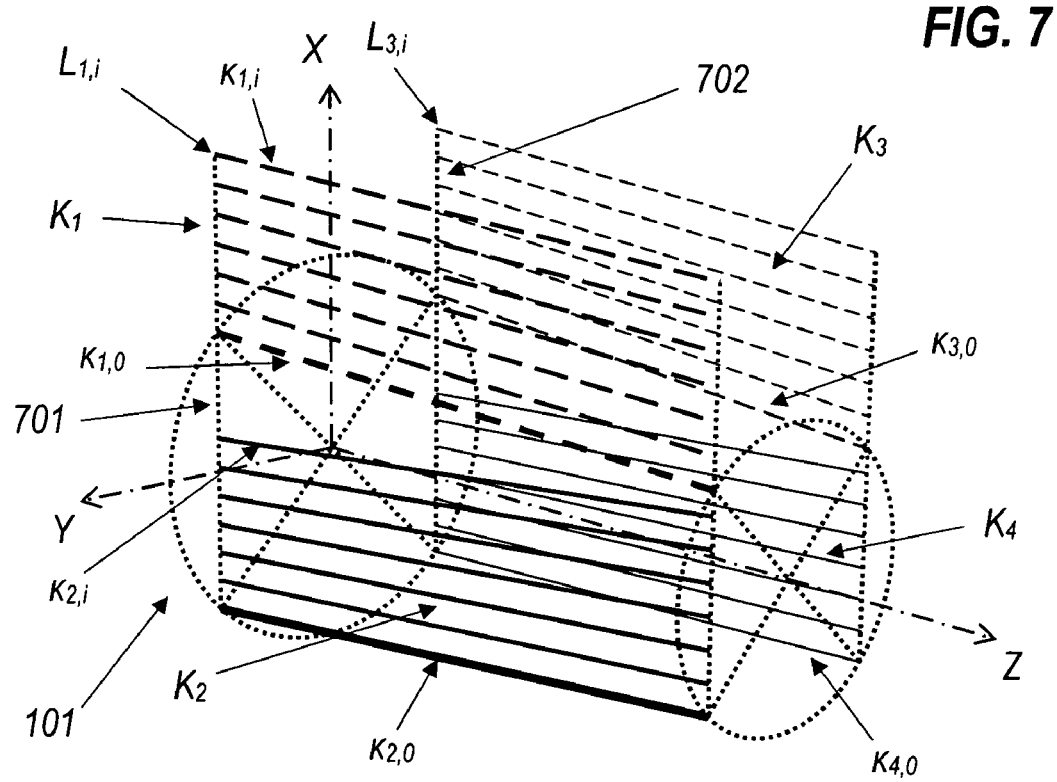

FIG. 7 shows four uniparametric bundles of skew rays. Bundle $K_1$ is composed of rays (e.g. $\kappa_{1,i}$) exiting from points (e.g. $L_{1,i}$) along the line 701 parallel to the X axis in the object plane 101 and parallel to ray $\kappa_{1,0}$ described in FIG. 6. Bundle $K_2$ is composed by rays (e.g. $\kappa_{2,i}$) exiting from points (e.g. $L_{2,i}$) in the object plane 101 along the line 701 and parallel to ray $\kappa_{2,0}$ described in FIG. 6. Bundles $K_3$ and $K_4$ are, respectively, symmetrical to bundles $K_1$ and $K_2$ respect to plane XZ and exit from a line 702 parallel to the X axis symmetrically to line 701.

In general, the initial points P, Q, R, L may be chosen so as to sample the volume in the r-$\rho$-$\phi$ spatial-angular phase space defined by the object and the entry pupil, and so that the curves representing the selected bundles are spaced apart at rather constant increments of ds, where $ds^2 = dr^2 + d\rho^2 + \rho^2 d\phi^2$. When selecting the ray bundles The user may assess how completely the selected ray bundles span the volume in the r-$\rho$-$\phi$ spatial-angular phase space defined by the object and the entry pupil, or how evenly the selected bundles are spaced apart in increments of ds, or both. In the 2004 Fernando Muñoz thesis, we made calculations for the optimum spacing among bundles and the optimum spacing from the bundles to the edge for the case of pupil discretization based on the Wavefront Aberration Function W(r, $\rho$, $\phi$), which measures the image quality. Those calculations are incorporated herein by reference.

In the paper Pablo Benítez, Juan C. Miñano, "*Ultrahigh-numerical-aperture imaging concentrator*", Journal of the Optical Society of America A, 14, pp. 1988-1997, (1997)) an RX design for an imaging system, using 2 meridian ray bundles with object discretization was analyzed. In that paper we showed for a specific design that the optimum spacing was to place the 2 object point at $r=+-\frac{2}{3}R$, where R is the radius of the object. (In that calculation, the object is located at infinity, so r becomes the angle $\alpha$, such as $\alpha_6$ of FIG. 4 or $\alpha_7$ of FIG. 6, and R is the maximum value of $\alpha$). That paper showed that that spacing between rays was superior to the conventional full-aplanatic approach first proposed by Schwarzschild mentioned above (which is equivalent to the limit in which the 2 object points separation tends to zero).

In the present processes, the objective of uniform spacing ds may be violated when desired, for example, when a different approach is convenient for other reasons. Even when uniform ds is a starting objective, strict compliance may not be practical, because the curves are not necessarily parallel, indeed, some pairs of curves can meet at the starting points, so the spacing ds may not be well-defined. In the start condition for the described embodiments, all bundles coincide in the same equivalent ray. This configuration, although undesired with respect to the uniform spacing, allows us to create the surfaces without any iterative method, as described below. If equispaced bundles are forced from the beginning, it is believed to be difficult to conduct the surface calculations without inconvenient and time consuming iteration.

As mentioned above, conventional methods are based on the calculation of the minimum of a merit function using ray tracing and a parametric representation of a selected group and type of optical surfaces. In those methods, the ray-tracing sampling is discrete in all variables r, $\rho$, $\phi$. (The sample rays correspond to isolated points in that space.) That is, no uniparametric ray-bundle families are used.

The processes described below may still require a trial and error optimization to find the best choice of the bundles. However, the design methods are radically different, in that the conventional methods need an initial guess of the optical surfaces to start optimization, while the processes described in the present specification need an initial guess of the design bundles to start optimization. The result is in general rather different, because the conventional initial guess is usually based on simple spherical, paraxial optics, while the first surfaces obtained with the presently described processes starting from initially guessed bundles are neither spherical nor paraxial.

Figure 8:
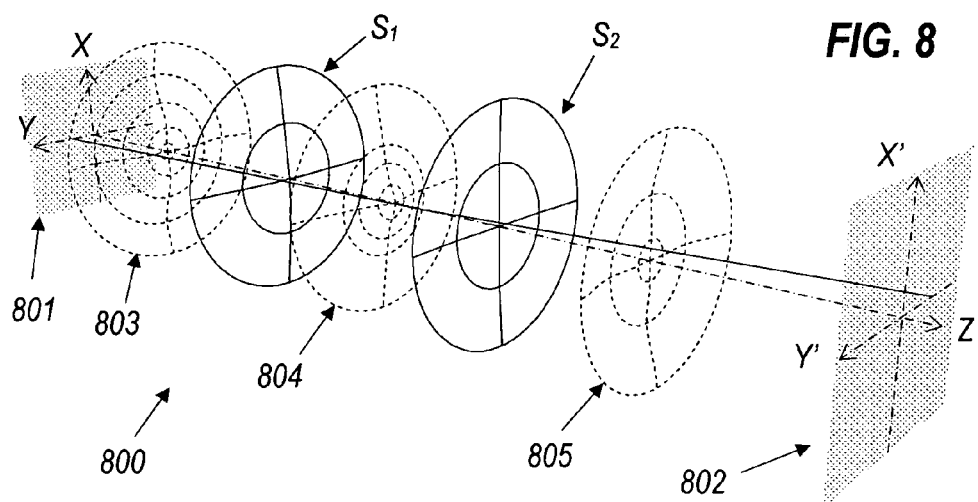
FIGS. 8 to 12 are ray diagrams for successive stages of a further embodiment of a method of designing optical surfaces.

FIG. 8 shows an optical system indicated generally by the reference numeral 800 that has circular symmetry (in cylindrical coordinates $\rho$, $\theta$, z, where the z axis is the axis of symmetry and the optical axis of the system). Object plane 801 is at z=0 and image plane 802 is at z=z'. Optical system 801 consists essentially of two aspheric surfaces $S_1$ and $S_2$ to be calculated, and several intermediate known surfaces. 803 represents a number of intermediate surfaces between the object plane 801 and the surface $S_1$, 804 represents a number of intermediate surfaces between surfaces $S_1$ and $S_2$, and finally, 805 represents a number of intermediate surfaces between the surface $S_2$ and the image plane 802. In general, the number of intermediate surfaces represented by any of 803, 804, 805 or similar features in later figures may be independently 0, 1, or more.

Figure 9:
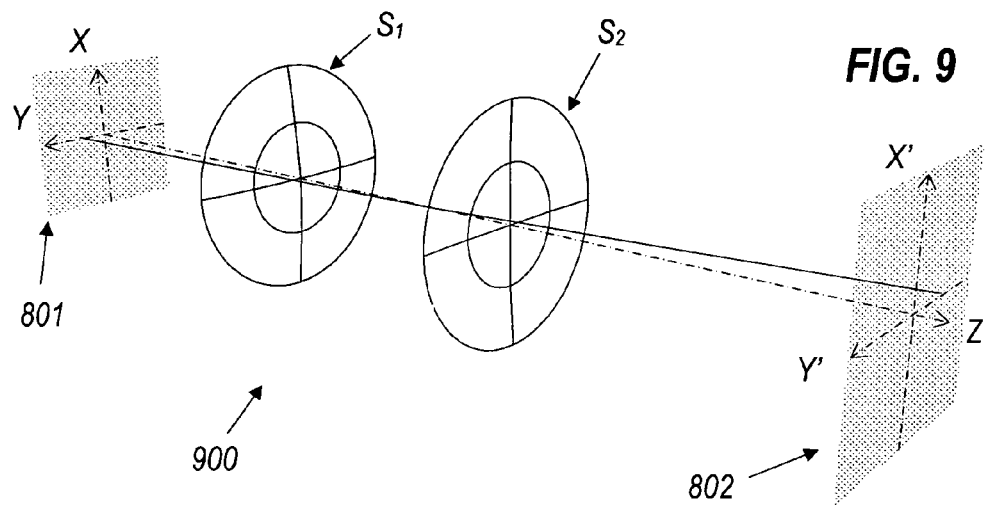

FIG. 9 shows the optical system 900 that is the same as system 800 in FIG. 8 without showing the intermediate surfaces 803, 804 and 805 for clarity.

Figure 10:
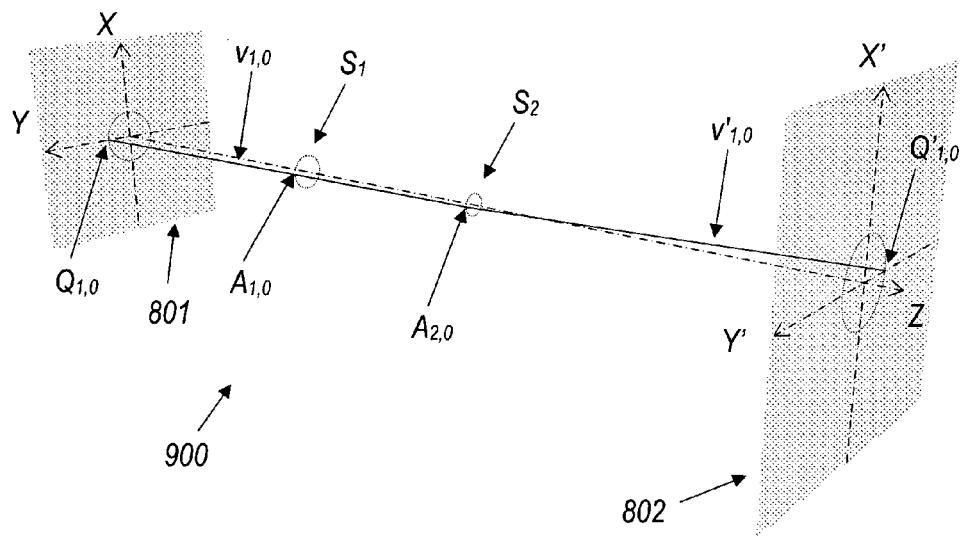

FIG. 10 shows the starting conditions for an embodiment of a process for the design of the two optical surfaces $S_1$, $S_2$ with two bundles of skew rays. Optical system 900 is rotationally symmetric. Uniparametric design bundles $N_1$, $N_2$, $N'_1$ and $N'_2$ formed by skew rays will be used. The bundles $N_1$, $N_2$ are bundles like the example bundles that appear in FIG. 2. $N_1$ and $N'_1$ are respectively symmetrical to $N_2$ and $N'_2$ relative to the XZ plane. Bundles $N_1$ and $N_2$ cross object plane 801 and are given while $N'_1$ and $N'_2$ cross image plane 802 and are initially unknown.

In this case, rays (except ray $v_{1,0}$) are not contained in a meridional plane. Rays that belong to bundle $N_1$ are parallel to plane XZ and exit from points ($\zeta$, $y_0$, 0), where $\zeta$ is the parameter, and $y_0$ is a positive real number. Thus Cartesian coordinates will be used instead of cylindrical. The object plane 801 is at z=0 and the image plane 802 is at z=z'. Designate the two surfaces to be calculated as $S_1$ and $S_2$. There are $n_1$ known surfaces (see feature 803 in FIG. 8) between the object plane and surface $S_1$, $n_2$ known surfaces 804 between surfaces $S_1$ and $S_2$, and finally $n_3$ known surfaces 805 between surface $S_2$ and the image plane 802. These surfaces ensure the generality of the design method described. Points Q(x, y, 0) on object plane 801 and points Q'(x', y', z') on image plane 802 scale as x'=m·x, y'=m·y, where m is the magnification of the optical system 800.

FIG. 10 shows the starting of the calculation of surfaces $S_1$ and $S_2$ by defining two initial seed points. Define seed point $A_{1,0}$ as a point on surface $S_1$ at a defined distance from the axis with a known normal vector to surface $S_1$. Define $v_{1,0}$ as the meridional ray of bundle $N_1$ emitted from a point $Q_{1,0}$ (0, $y_{1,0}$, 0) on the object plane 801 and crossing surface $S_1$ at point $A_{1,0}$. Throughout these examples, it is to be understood that if known additional surfaces such as surfaces 803, shown at this position in FIG. 8, are present, the ray is deflected at the known surfaces. Calculate the deflection of ray $v_{1,0}$ at point $A_{1,0}$ using the known normal vector. Identify the point $A_{2,0}$ as the point on surface $S_2$ along the path of $v_{1,0}$ after it is deflected at $A_{1,0}$. Alternatively, choose the point $A_{2,0}$ as a second seed point, and calculate the normal at $A_{1,0}$ so that the ray $v_{1,0}$ is deflected to $A_{2,0}$. The normal vector to surface $S_2$ at $A_{2,0}$ is calculated such that the ray deflected at $A_{2,0}$ will intersect the image plane at a given point $Q'_{1,0}$ related to $Q_{1,0}$ by the abovementioned magnification m.

Figure 11:
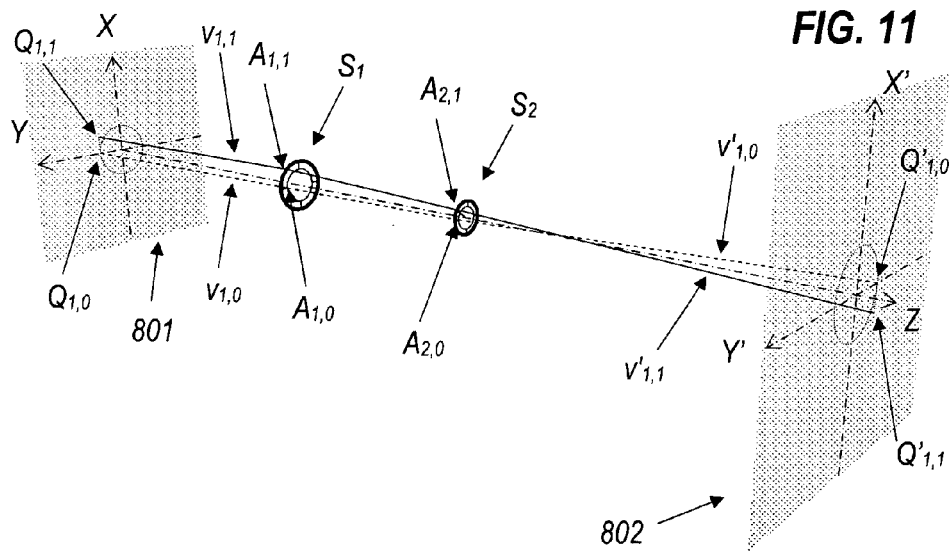

FIG. 11 shows the calculation of the first portions $S_{1,1}$ and $S_{1,2}$ of surfaces $S_1$ and $S_2$. Consider an incremental offset $\delta x$ parallel to the x-axis relative to the previously calculated point $Q_{1,0}(0, y_{1,0}, 0)$, defining a new point $Q_{1,1}(\delta x, y_{1,0}, 0)$.

Define a line perpendicular to the normal vector to $S_1$ at $A_{1,0}$ and rotate it around the optical axis (z axis) to generate a cone, as shown in FIG. 11. The intersection between the cone and the ray belonging to bundle $N_1$ emitted from point $Q_{1,1}$ defines a point $A_{1,1}$. Make the normal vector to surface $S_1$ at $A_{1,1}$ lie in the meridional plane through $A_{1,1}$, as is the case for all rotationally symmetric surfaces, and choose an initial alignment for the normal vector through $A_{1,1}$ within that meridional plane.

Next rotate the line perpendicular to the normal vector to $N_2$ at $A_{2,0}$ around the optical axis to generate another cone. The intersection between that cone and the ray deflected at $A_{1,1}$ defines point $A_{2,1}$. The ray deflected at $A_{2,1}$ must be redirected to point $Q'_{1,1}$=(m·$\delta x$, m·$y_{1,0}$, 0). Since we know the incident and deflected rays at point $A_{2,1}$, we can calculate its normal. There is, however, no guarantee that this normal vector is perpendicular to a surface with circular symmetry. If not, then try different values of the normal vector at $A_{1,1}$ until the normal vector at $A_{2,1}$ is in a meridional plane.

Figure 12:
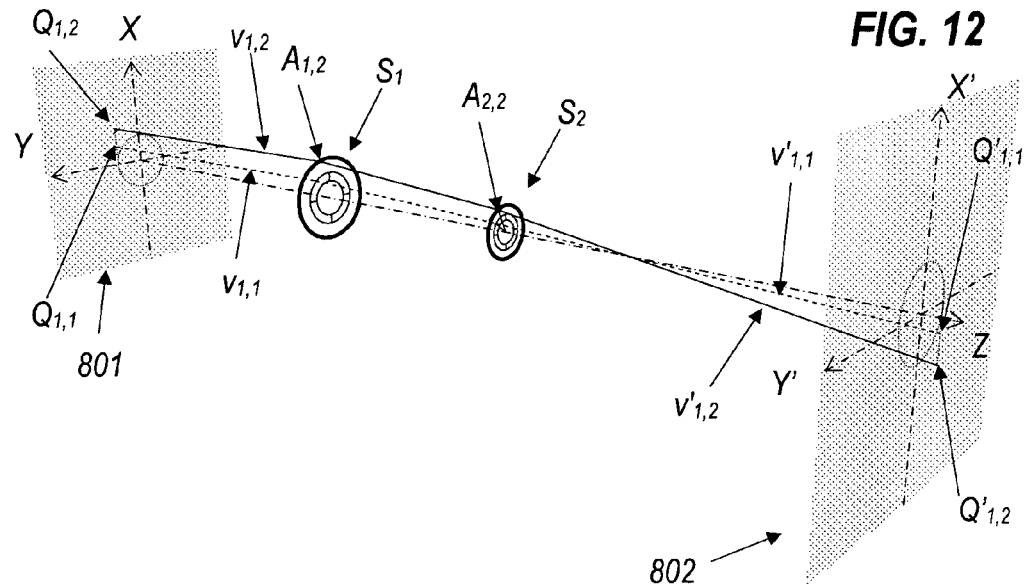

FIG. 12 shows the repetition of the step above using the calculated points $A_{1,1}$ and $A_{2,1}$ and another ray from bundle $N_1$ to calculate new points $A_{1,2}$ and $A_{2,2}$ and so on, going through all the rays of bundle $N_1$ that cross the object plane.

It seems that with one design bundle (e.g. $N_1$) we are able to calculate two optical surfaces, but, in fact, we are using at the same time the other and symmetric bundle $N_2$ because we would have calculated the same portions of surfaces $S_1$ and $S_2$ if we had used the other bundle $N_2$. So here and after, we are going to say that with one skew bundle of rays (and implicitly with its symmetrical bundles) we are able to design two optical surfaces.

In these types of designs there is no need for the existence of a previously known portion of surface as a basis to generate a new optical surface, since the two optical surfaces are generated at the same time. Therefore, it only takes the choice of two initial seed points to develop both optical surfaces. These two points are usually off-axis and sometimes it is necessary to define a portion of surface between each one of them and the optical axis. These portions of surface may be prefixed by an interpolated surface or generated using skew rays. When using skew rays, the method described for FIG. 10 to FIG. 12 may be used, but first the surfaces must "grow" towards the optical axis by means of rays that will cross, for example, surface $S_1$ at a smaller radius from the axis than the initial point $A_{1,0}$.

Figure 13:
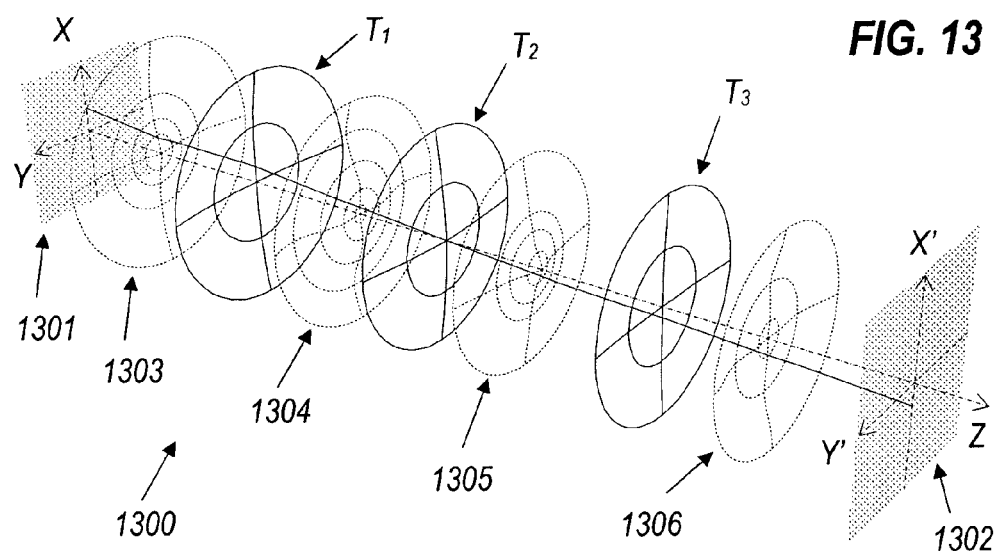
FIGS. 13 to 19 are ray diagrams for successive stages of a further embodiment of a method of designing optical surfaces.

FIG. 13 shows an optical system indicated generally by the reference numeral 1300 that has circular symmetry. Object plane 1301 is at z=0 and image plane 1302 is at z=z'. It consists essentially of three surfaces $T_1$, $T_2$ and $T_3$ to be calculated and several intermediate surfaces. 1303 represents a number of intermediate surfaces between the object plane 1301 and the surface $T_1$, 1304 represents a number of intermediate surfaces between surfaces $T_1$ and $T_2$, 1305 represents a number of intermediate surfaces between surfaces $T_2$ and $T_3$, and finally, 1306 represents a number of intermediate surfaces between the surface $T_3$ and the image plane 1302.

Figure 14:
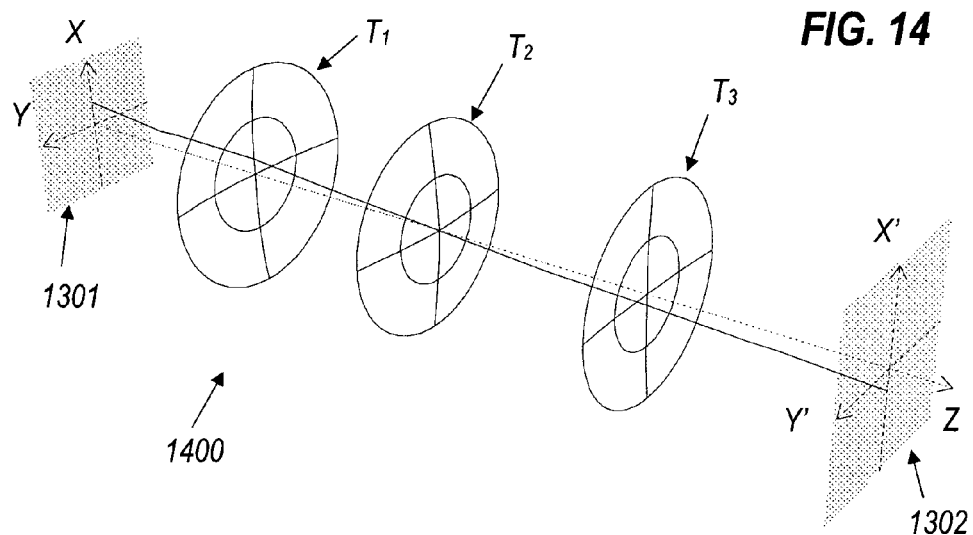

FIG. 14 shows an optical system 1400 that is the same as system 1300 in FIG. 13 omitting the intermediate surfaces 1303, 1304, 1305 and 1306 for clarity.

Figure 15:
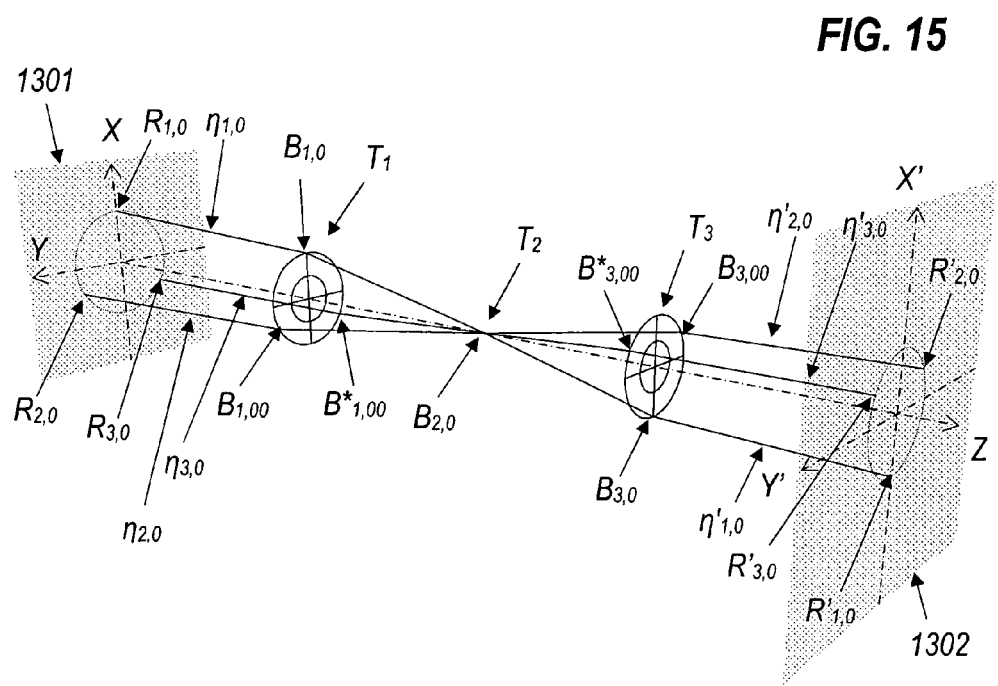

FIG. 15 shows the starting conditions for one embodiment of a process for the design of three optical surfaces with two bundles of skew rays and one bundle of meridional rays.

Designate as $T_1$, $T_2$ and $T_3$ the surfaces to be calculated, and consider that there may be known intermediate surfaces in the system: $n_1$ surfaces 1303 (not shown in FIG. 15) between the object plane 1301 and $T_1$, $n_2$ surfaces 1304 between $T_1$ and $T_2$, $n_3$ surfaces 1305 between $T_2$ and $T_3$, and $n_4$ surfaces 1306 between $T_3$ and the image plane 1302. All surfaces are circularly symmetric.

Designate as $H_1$, $H_2$ and $H_3$ three uniparametric bundles as shown in FIG. 4 and FIG. 5 starting from the object plane 1301, and $H'_1$, $H'_2$ and $H'_3$ three other, initially unknown, uniparametric bundles falling on the image plane 1302. Let $H_1$ and $H'_1$ be meridional bundles. Bundles $H_2$ and $H_3$ are skew and symmetrical relative to a meridional plane (in this case the XZ plane), and $H'_2$ and $H'_3$ are skew and symmetrical relative to the same meridional plane. The bundles $H_2$ and $H_3$ cannot yet be completely defined.

Points R(x, y, 0) on the object plane 1301 having the values of y chosen as shown in FIG. 4 emit three rays $\eta_1(R)$, $\eta_2(R)$, and $\eta_3(R)$, belonging to bundles $H_1$, $H_2$ and $H_3$ respectively. These bundles are formed by rays as shown in FIG. 5, that is, points R(x, y, 0) where y is chosen and x is the varying parameter, and within each bundle all the rays are parallel, that is to say, converge on a single point of the entry pupil (which is at infinity). These rays propagate through the system and exit as rays $\eta'_1(R')$, $\eta'_2(R')$, and $\eta'_3(R')$ that cross the image plane 1302 at point R'(mx, my, z').

Since the skew rays are symmetrical relative to the plane XZ, a ray of $H_2$ and its symmetrically corresponding ray in $H_3$, in the following description, when a skew bundle is referred to, the reference also applies to its symmetrical correspondent, and the same is true for the rays of these bundles. The calculation of the surfaces $T_1$, $T_2$ and $T_3$ is as follows:

First choose the initial seeds of the surfaces. Here we are to consider the case where one surface is initially seeded as a point.

Calculate the initial portions of two surfaces and choose a point on the third surface. This leads to three possibilities for starting the design, depending upon which of the three surfaces is chosen as the point.

First choose an axial point $B_{2,0}$ on surface $T_2$ and a first portion $T_{1,0}$ of surface $T_1$. Make $T_{1,0}$ a surface that is generated from circular symmetry of a differentiable curve (e.g., an even polynomial). Now calculate the first portion $T_{3,0}$ of surface $T_3$ as the interpolated surface whose edge contains points $B_{3,0}$, $B_{3,00}$ and $B^*_{3,00}$. Define rays $\eta_{1,0}$, $\eta_{2,0}$ and $\eta_{3,0}$ from bundles $H_1$, $H_2$ and $H_3$ that are deflected at $T_{1,0}$, pass through point $B_{2,0}$ and arrive at $B_{3,0}$, $B_{3,00}$ and $B^*_{3,00}$, respectively. These rays are emitted from points $R_{1,0}$, $R_{2,0}$ and $R_{3,0}$ on object plane 1301 and after deflecting on $T_{3,0}$ arrive at points $R'_{1,0}$, $R'_{2,0}$ and $R'_{3,0}$ on object plane 1302. Once the rays $\eta_{1,0}$, $\eta_{2,0}$ and $\eta_{3,0}$ are chosen, and assuming the bundles $H_2$ and $H_3$ exit from lines parallel to but offset from the X axis as shown in FIG. 5, the values of $y=\in$ and $\alpha_6$ for the bundles $H_2$ and $H_3$ are determined.

Figure 16:
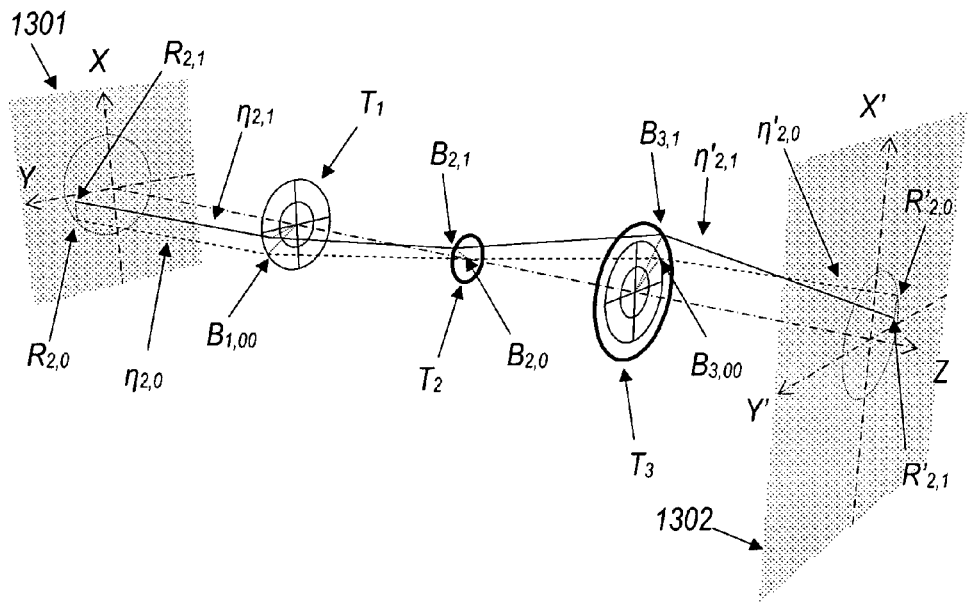

FIG. 16 shows the calculation of $T_{2,1}$ (the first portion of surface $T_2$) and $T_{3,1}$ (the next portion of surface $T_3$). Define $H_{2,1}$ as the set of rays belonging to the bundle $H_2$ that are emitted from points between $R_{2,0}$ and $R_{2,1}$ and arrive at surface $T_2$ after propagating through the $n_1$ initial surfaces (not shown), $T_1$, and finally the $n_2$ intermediate surfaces [not shown]. The set of rays $H_{2,1}$ then continues through the $n_3$ intermediate surfaces to surface $T_3$. Remember that, because $H_2$ is a skew bundle formed as shown in FIG. 5, the source points from $R_{2,0}$ to $R_{2,1}$ are in a plane that is parallel to the XZ plane of FIG. 17.

The new portions $T_{2,1}$ and $T_{3,1}$ will be the skew-imaging ovals between points $B_{2,0}$ and $B_{2,1}$ and $B_{3,0}$ and $B_{3,1}$, respectively, that transform the rays of bundle $H_{2,1}$ emitted from points $R(x, y, 0)$ in the range $[R_{2,0}, R_{2,1}]$ on object plane 1301 into rays belonging to another bundle $H'_{2,1}$ that cross the image plane 1302 at points $R'(x', y', z')$ in the range $[R'_{2,0}, R'_{2,1}]$, such that $x'=mx$ and $y'=my$. These imaging ovals are calculated as follows:

Define $\Delta$ as an incremental displacement normal to the optical axis (z axis) and to the y axis. Consider an offset parallel to the x axis relative to the point $R_{2,0}(x_{2,0}, \in, 0)$, where $\in$ is the distance between the XZ plane and the plane of the points that emit bundle $H_2$. The new point has the coordinates $R(x_{2,0}+\Delta, \in, 0)$. Consider the cone coaxial with the optical axis of the system and tangent to the second optical surface $T_2$ at point $B_{2,0}$. In this particular case the normal to $B_{2,0}$ points in the direction of the z axis so that the cone degenerates into a plane perpendicular to the z axis.

A skew ray of bundle $H_2$ emitted from point R propagates through the first $n_1$ initial surfaces (see 1303 in FIG. 13), then surface $T_1$ and then the intermediate $n_2$ surfaces 1304. It intersects the aforementioned cone tangent to the optical surface at point $C_{2,0}$ and defines point $B_2$. We choose a normal vector to surface $T_2$ at $B_2$ on the meridional plane through $B_2$.

Next consider the cone tangent to the optical surface at point $B_{3,0}$ (and coaxial with the optical axis of the system as defined above). The ray deflected at $B_2$ propagates through $n_3$ intermediate surfaces 1305, intersects this cone and defines point $B_3$. The ray deflected at $B_3$ must cross the image plane 1302 at $R'(m(x_{2,0}+\Delta), m\in, z')$. The directions of the incident and deflected rays at $B_3$, together with the properties of the surface $T_3$, are sufficient to defines the normal to the surface $T_3$ at $B_3$. There is, however, no guarantee that this normal vector is perpendicular to a rotationally symmetric surface. If not, alter the normal vector at $B_2$ until the normal vector at the new $B_3$ is also in a meridional plane (to ensure that the surfaces being generated have circular symmetry). The propagation of this skew ray through the system then defines the normal vectors at both $B_2$ and $B_3$.

Then continue incrementing $\Delta$ until we reach $R_{2,1}$.

Figure 17:
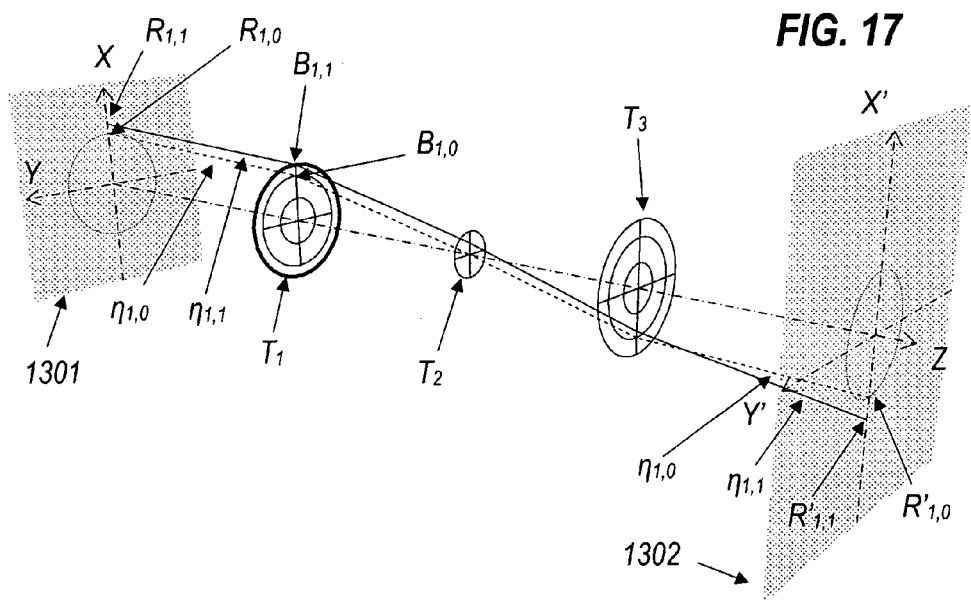

FIG. 17 shows the calculation of $T_{1,1}$, the first calculated portion of surface $T_1$. Define $H_{1,1}$ as the set of rays $[\eta_{1,0}, \eta_{1,1}]$ belonging to bundle $H_1$ that are emitted from points between $R_{1,0}$ and $R_{1,1}$ and arrive at surface $T_1$ after propagating through the initial $n_1$ surfaces.

The new portion $T_{1,1}$ will be the meridional imaging oval between points $B_{1,0}$ and $B_{1,1}$ that transforms the rays of bundle $H_{1,1}$ emitted from points $R(x, 0)$ in the range $[R_{1,0}, R_{1,1}]$ on object plane 1301 into rays $[\eta'_{1,0}, \eta'_{1,1}]$ belonging to another bundle $H'_{1,1}$ crossing image plane 1302 at points $R'(x', z')$ in the range $[R'_{1,0}, R'_{1,1}]$, such that $x'=mx$. This imaging oval is calculated as follows:

Let $\delta x$ be an increment of the x-coordinate. Define a point R as $(x_{1,0}+\delta x, 0)$. Let $\eta$ be the ray emitted from point R, propagated through the $n_1$ surfaces [not shown], that intersects surface $T_1$ at a new point $B_1$ to be calculated by means of an algorithm. Then, it will continue propagating as ray $\eta'$. This ray will propagate through the $n_2$ surfaces [not shown] between $T_1$ and $T_2$, through the surface $T_2$, through the $n_3$ surfaces [not shown] between $T_2$ and $T_3$, through the surface $T_3$ and cross the image plane at R', defined as $(m \cdot (x_{1,0}+\delta x), 0)$.

The portion of surface between points $B_1$ (to be calculated) and $B_{1,0}$ can be represented by a 2nd degree polynomial: $F(x)=b_2 x^2+b_1 x+b_0$ with coefficients $b_2$, $b_1$ and $b_0$. The position of $B_{1,0}$ imposes a condition $F(x_{B10})=z_{B10}=b_2 \cdot x^2_{B10}+b_1 \cdot x_{B10}+a_0$ on the polynomial and the normal at $B_{1,0}$ imposes another condition on its first derivative: $F'(x_{B10})=z'_{B10}=2 \cdot b_2 \cdot x_{B10}+b_1$. These two conditions determine two coefficients, leaving one free (e.g., $b_2$). We may now choose a value for this free coefficient (e.g., $b_2$), completely defining the polynomial at $B_{1,0}$. This polynomial curve extends the surface beyond point $B_{1,0}$. Ray $\mu$ intersects this polynomial curve at a point $B^*_1$ and is refracted there. Ray $\mu'$ continues to propagate through the $n_2$ surfaces [not shown], surface $T_2$, $n_3$ surfaces [not shown], surface $T_3$ and reaches the image plane 1302 at a point R'. If $R'=(m \cdot (x_{1,0}+\delta x), 0)$, then we make $B_1=B^*_1$ and the normal at $B_1$ is given by the normal to the polynomial curve at that point. If $R' \neq (m \cdot (x_{1,0}+\delta x), 0)$, then we must iterate, choosing different values for free polynomial coefficient (e.g. $b_2$) until condition $P'=(m \cdot (x_{1,0}+\delta x), 0)$ is met. This process defines another point B on $T_1$ between points $B_{1,0}$ and $B_{1,1}$ based on point $B_{1,0}$.

We may now define another point R on the object plane 1301 as, for example, $R=(x_{1,0}+2\delta x, 0)$ and repeat the process calculating a new point $B_1$ on $T_1$ between points $B_{1,0}$ and $B_{1,1}$, but now based on point $B_1$ previously calculated. The process continues until the portion between points $B_{1,0}$ and $B_{1,1}$ on $T_1$ is completely defined.

Figure 18:
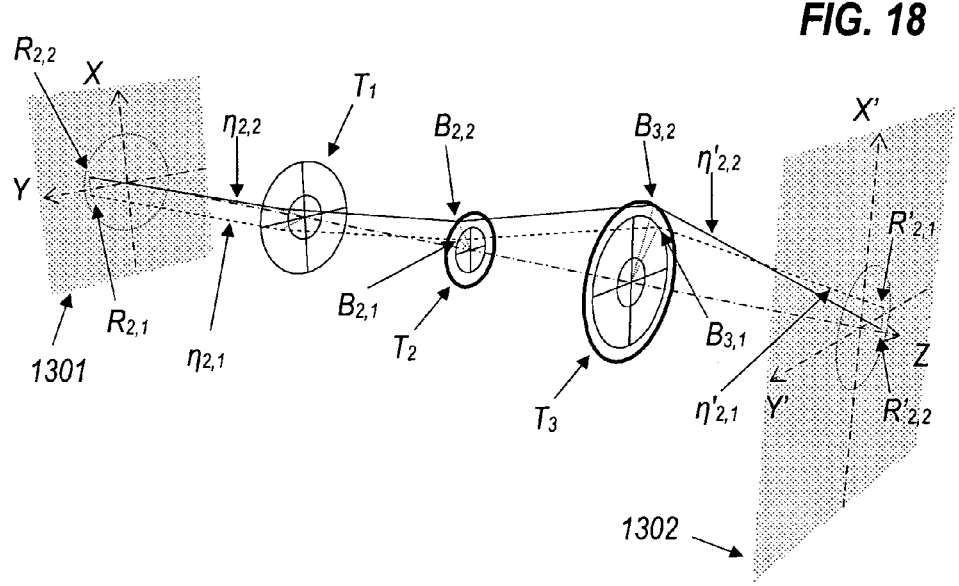

FIG. 18 shows the calculation of $T_{2,2}$ from $B_{2,1}$ to $B_{2,2}$ and $T_{3,2}$ from $B_{3,1}$ to $B_{3,2}$ with skew rays $[\eta_{2,1}, \eta_{2,2}]$ of the bundle $H_2$ from points $[R_{2,1}, R_{2,2}]$ and skew rays $[\eta'_{2,1}, \eta'_{2,2}]$ to points $[R'_{2,1}, R'_{2,2}]$ in the same way that $T_{2,1}$ and $T_{3,1}$ have been calculated in FIG. 16.

Figure 19:
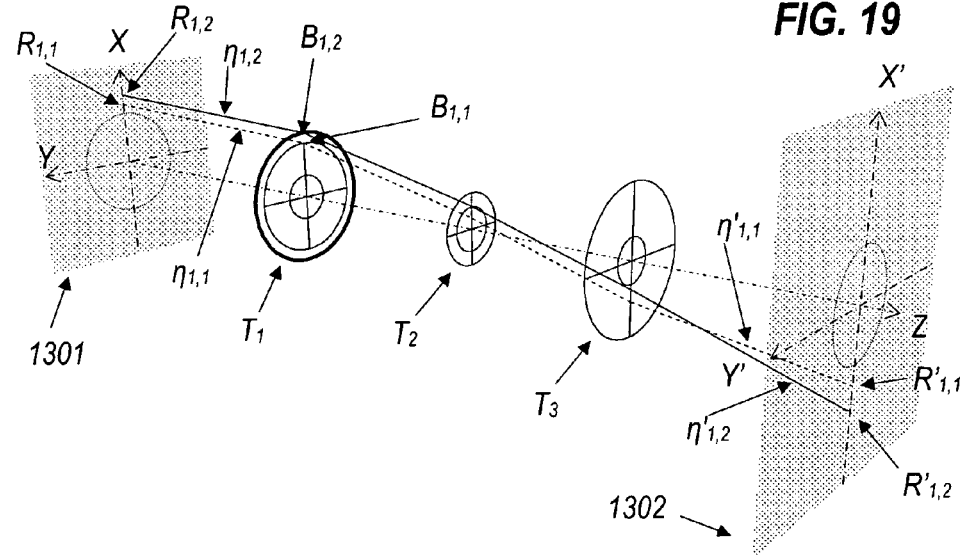

FIG. 19 shows the calculation of $T_{1,2}$ with meridional rays $[\eta_{1,1}, \eta_{1,2}]$ of the bundle $H_1$ emitted from points $R(x, 0)$ in the range $[R_{1,1}, R_{1,2}]$ on object plane 1301 and transformed into rays $[\eta'_{1,1}, \eta'_{1,2}]$ crossing image plane 1302 at points $R'(x', z')$ in the range $[R'_{1,1}, R'_{1,2}]$, in the same way that $T_{1,1}$ has been calculated in FIG. 17.

Continue calculating successively portions $T_{1,k}$, $T_{2,k}$ and $T_{3,k}$ in accordance with FIGS. 18 and 19 for increasing k, until the system design has utilized all the object points.

In FIG. 15, two surfaces (the initial section of $T_1$ and the initial point of $T_2$) were prescribed. With a bundle of meridional rays it is only possible to design one surface, so the other surface has to be prescribed. This way of beginning is not optimal.

First, having to define the prescribed curve increases the number of initial parameters selected by the user. That increases the complexity of the design process, because of the task of finding a set of optimum initial parameters to start the design.

Second, the geometry of the design may dictate a large design with a big initial zone defined by an optical surface that is not calculated for the design bundles.

One solution to these concerns could consist in designing this surface simultaneously with the other. We have seen that we can calculate two surfaces at the same time if we use skew bundles.

Referring now to FIGS. 20 to 26, FIG. 20 shows an optical system indicated generally by the reference numeral 2000 that has circular symmetry. Object plane 2001 is at z=0 and image plane 2002 is at z=z'. Optical system 2000 consists essentially of four surfaces $U_1$, $U_2$, $U_3$ and $U_4$ to be calculated and several intermediate surfaces. 2003 represents a number of intermediate surfaces between the object plane 2001 and the surface $U_1$, 2004 represents a number of intermediate surfaces between surfaces $U_1$ and $U_2$, 2005 represents a number of intermediate surfaces between surfaces $U_2$ and $U_3$, 2006 represents a number of intermediate surfaces between surfaces $U_3$ and $U_4$, and finally, 2007 represents a number of intermediate surfaces between the surface $U_4$ and the image plane 2002.

Figure 20:
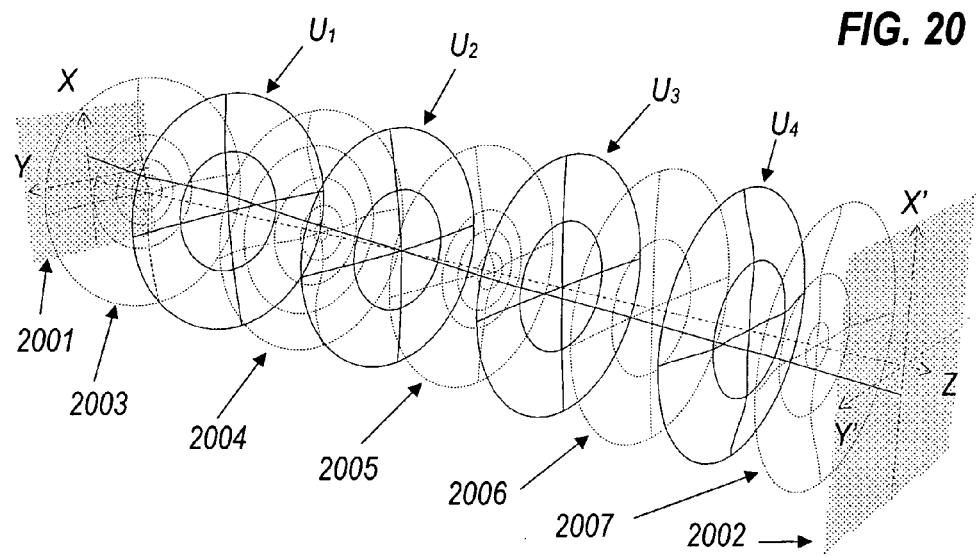
FIGS. 20 to 26 are ray diagrams for successive stages of a further embodiment of a method of designing optical surfaces.
Figure 21:
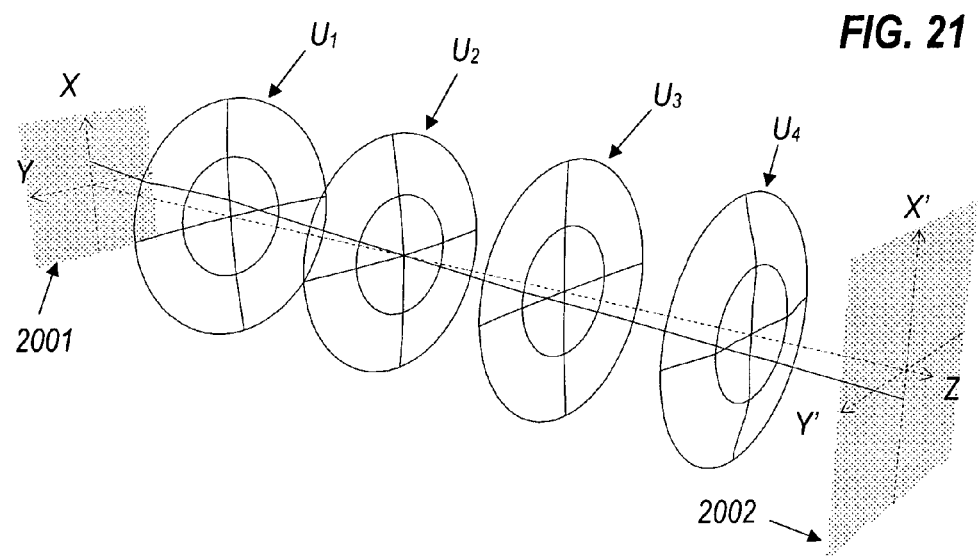

FIG. 21 shows the optical system 2100 that is the same as system 2000 in FIG. 20, omitting the intermediate surfaces 2003, 2004, 2005, 2006 and 2007 for clarity.

Figure 22:
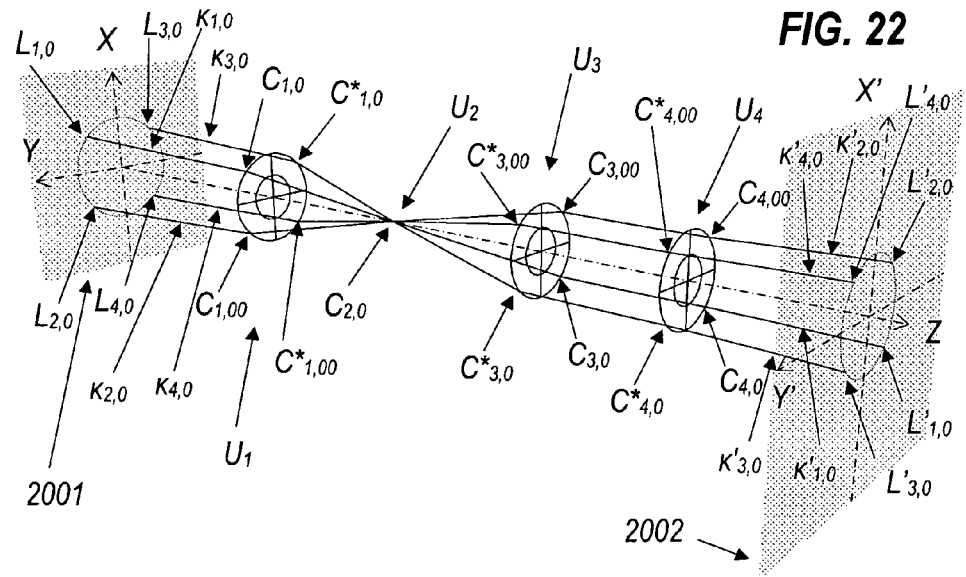

FIG. 22 shows the starting conditions for one embodiment of a process for the design of four optical surfaces with four bundles of skew rays. Particular cases of these types of bundles are shown in FIG. 6 and FIG. 7.

Let us suppose that, from the four design bundles $K_1$, $K_2$, $K_3$ and $K_4$ of skew rays originating from the object plane 2001, the two bundles with odd sub-index are symmetric and the two bundles with even sub-index are also symmetric. It will usually be enough to mention the first bundle of each pair when we are referring to the four bundles. The same considerations apply with the uniparametric, skew and initially unknown bundles $K'_1$, $K'_2$, $K'_3$ and $K'_4$ falling on the image plane 2102.

Given M meridian ray-bundles and S non-redundant skew ray bundles, it is possible to design N=M+2S surfaces. The factor of 2 comes from the fact that we are allocating the symmetric (redundant) bundles. It is conceptually clearer to state that when designing N surfaces, N bundles (counting both members of any symmetric pair) are used. In FIGS. 20 to 26, N=4 surfaces are designed by stigmatically imaging N=4 bundles ($K_1$, $K_2$, $K_3$ and $K_4$), although in the design process as shown in FIGS. 23 to 26 only the non-redundant bundles are shown. As may be seen from FIG. 7 or from a comparison of FIGS. 23 and 24, bundles K1 and K2 may be facially redundant, but are not redundant as applied, because the part of K1 with |x| greater than the meridional ray, and the part of K2 between x=0 and the meridional ray, are used. Note that this is consistent with the description of the N=3 surface designing N=3 ray bundles (1 meridian ray-bundle and 2 (symmetric, redundant) skew bundles), as shown in FIGS. 4 to 5 and FIGS. 15 to 19.

For each point L of the object 2001, two rays $\kappa_1(L)$ and $\kappa_2(L)$, one ray from each of the design bundles $K_1$, $K_2$ will leave, pass through the system and exit converted into $\kappa'_1(L)$ and $\kappa'_2(L)$, rays that will arrive at point $L_1$ in the image 2002 that is related to L by the expressions: x'=m·x and y'=m·y, where L(x, y, z) and L'(x', y', z') are points of the object plane 2001 and image plane 2002, respectively.

Let us consider the most general case of an optical system of four surfaces $U_1$, $U_2$, $U_3$ and $U_4$, in which there may be some known intermediate surfaces, i.e., $n_1$ surfaces 2003 between the object plane 2101 and $U_1$, $n_2$ surfaces 2004 between $U_1$ and $U_2$, $n_3$ surfaces 2005 between $U_2$ and $U_3$, $n_4$ surfaces 2006 between $U_3$ and $U_4$ and $n_5$ surfaces 2007 between $U_4$ and the image plane 2002. As in the previous embodiments, each of $n_1$, $n_2$, $n_3$, $n_4$, and $n_5$ may independently be zero, one, or more. The surfaces 2003, 2004, 2005, 2006, 2007 are shown in FIG. 20, but are omitted from FIGS. 21 to 26 in the interests of clarity.

The process to calculate the surfaces $U_1$, $U_2$, $U_3$ and $U_4$ will be the following:

First, obtain initial sections of three surfaces and an initial fixed point of the fourth according to FIG. 22.

Define initial sections $U_{1,0}$ of the surface $U_1$ between points $C_{1,00}$, $C_{1,0}$, $C^*_{1,00}$ and $C^*_{1,0}$ and $U_{3,0}$ of the surface $U_3$ between points $C_{3,00}$, $C_{3,0}$, $C^*_{3,00}$ and $C^*_{3,0}$ as two differentiable curves, e.g., even degree polynomials, and define $C_{2,0}$ as the axial point that belongs to $U_2$. Because of the rotational symmetry of the system, we may suppose that the surface $U_2$ has zero derivative on axis, so the normal vector of $U_2$ at $C_{2,0}$ is parallel to the optical axis.

Let $K_0$ be a uniparametric bundle of meridional rays that pass through the surfaces existing between the object and $U_2$ and arrive at $C_{2,0}$. Let $\kappa_{1,0}$, $\kappa_{2,0}$, $\kappa_{3,0}$ and $\kappa_{4,0}$ be four edge rays that leave from the points $L_{1,0}$, $L_{2,0}$, $L_{3,0}$ and $L_{4,0}$ in the object plane and whose intersection with $U_1$ defines the points $C_{1,0}$, $C_{1,00}$, $C^*_{1,0}$ and $C^*_{1,00}$. If the radius to the points $C_{1,0}$, $C_{1,00}$, $C^*_{1,0}$ and $C^*_{1,00}$ and the gradient of surface $U_1$ at those points has been defined as described above, this step determines the radius to the points $L_{1,0}$, $L_{2,0}$, $L_{3,0}$ and $L_{4,0}$ and the angle $\alpha_7$ of the rays when they exit those points. However, depending on the constraints of a specific design, different ones of these variables may be preselected, so that the remainder are derived at this step of the calculation. After exiting from $C_{2,0}$ and passing through the $n_3$ surfaces 2005 between $U_2$ and $U_3$, the edge rays $\kappa_{1,0}$, $\kappa_{2,0}$, $\kappa_{3,0}$ and $\kappa_{4,0}$ fall on $U_3$ at points $C_{3,0}$, $C_{3,00}$, $C^*_{3,0}$ and $C^*_{3,00}$, which those edge rays define. The intersection of bundle $K_0$ with surface $U_1$ and $U_3$ define the prescribed portions of such surfaces.

The rays of $K_0$ then pass through the $n_4$ surfaces [not shown] between $U_3$ and $U_4$, the edge rays $\kappa_{1,0}$, $\kappa_{2,0}$, $\kappa_{3,0}$ and $\kappa_{4,0}$ fall on $U_4$ at points $C_{4,0}$, $C_{4,00}$, $C^*_{4,0}$ and $C^*_{4,00}$, which those edge rays define.

Calculate $U_{4,0}$ between points $C_{4,0}$, $C_{4,00}$, $C^*_{4,0}$ and $C^*_{4,00}$ as the interpolated surface that fulfils the requirement that rays that leave points $C_{4,0}$, $C_{4,00}$, $C^*_{4,0}$ and $C^*_{4,00}$ arrive at $L'_{1,0}$, $L'_{2,0}$, $L'_{3,0}$ and $L'_{4,0}$.

Figure 23:
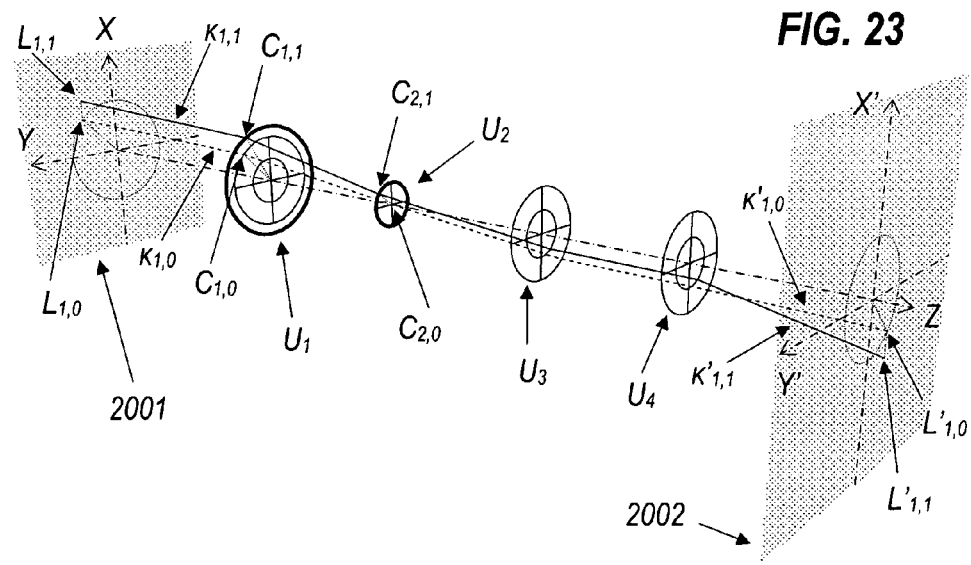

FIG. 23 shows the calculation of $U_{1,1}$ between points $C_{1,0}$ and $C_{1,1}$, the first calculated portion of the surface $U_1$, and $U_{2,1}$, between points $C_{2,0}$ and $C_{2,1}$, the first calculated portion of surface $U_2$.

Let $K_{1,1}$ be a set of rays belonging to the bundle $K_1$ that are emitted from points between $L_{1,0}$ and $L_{1,1}$ and arrive at surface $U_1$ and surface $U_2$ after propagating through the initial $n_1$ surfaces 2003 and the intermediate $n_2$ surfaces 2004.

The points of $K_{1,1}$ from $L_{1,0}$ to $L_{1,1}$ are in a plane that is parallel to the XZ plane, at y=∈. Because $K_0$ was defined uniparametrically, the azimuth θ of $L_{1,0}$, and therefore the value of ∈, are not predetermined, and a convenient value, typically with θ for the starting points $L_{1,0}$, $L_{2,0}$, $L_{3,0}$ and $L_{4,0}$ about 45° to the X and Y axes, may be chosen. The values of y=∈ for $L_{1,0}$ and y=η for $L_{2,0}$ may be chosen independently.

The new portions $U_{1,1}$ and $U_{2,1}$ will be the skew imaging ovals between points $C_{1,0}$ and $C_{1,1}$ and between $C_{2,0}$ and $C_{2,1}$, respectively, that transform the rays of bundle $K_{1,1}$ emitted from points L(x, ∈, 0) in the range $[L_{1,0}, L_{1,1}]$ on the object plane 2001 onto rays belonging to another bundle $K'_{1,1}$ crossing the image plane 2002 at points L'(x', y', z') in the range $[L'_{1,0}, L'_{1,1}]$, such that x'=mx and y'=m∈.

These imaging ovals are calculated as follows:

Let Δ be a differential increment. Let us consider an offset along the x axis relative to the point $L_{1,0}(x_{1,0}, ∈, 0)$, where ∈ is the distance between XZ plane and the plane of the points that emit bundle $K_1$. The new point has the coordinates $L(x_{1,0}+Δ, ∈, 0)$, but we only are going to represent its projection onto plane XZ.

We now consider the cone coaxial with the optical axis of the system and tangent to the optical surface at point $C_1$. In this particular case the normal to $C_1$ points in the direction of the z axis and therefore the cone degenerates into a plane perpendicular to the z axis.

A ray emitted from point L propagates through the first $n_1$ surfaces 2003. It intersects the cone coaxial with the optical axis of the system and tangent to the optical surface at point $C_{1,0}$ and defines point $C_1$. We choose a normal vector to surface $U_1$ at $C_1$ on the meridional plane through $C_1$.

Let us now consider the cone tangent to the optical surface at point $C_{2,0}$ (and coaxial with the optical axis of the system as defined above). The ray deflected at $C_1$ propagates through the $n_2$ intermediate surfaces 2004, intersects this cone and defines point $C_2$. The ray deflected at $C_2$ must cross the image plane 2002 at $L'(m·(x_{2,0}+Δ), m·∈, 0)$, after being deflected through the subsequently intervening optical surfaces $U_3$ and $U_4$. The direction of the incident and deflected rays at $C_2$ defines its normal. There is, however, no guarantee that this normal vector is perpendicular to a rotationally symmetric surface. We iterate the normal vector at $C_1$ until the normal vector at the new $C_2$ is also contained on a meridional plane (to ensure that the surfaces being generated have circular symmetry).

The propagation of this skew ray through the system then defines the normal vectors at both $C_1$ and $C_2$.

Figure 24:
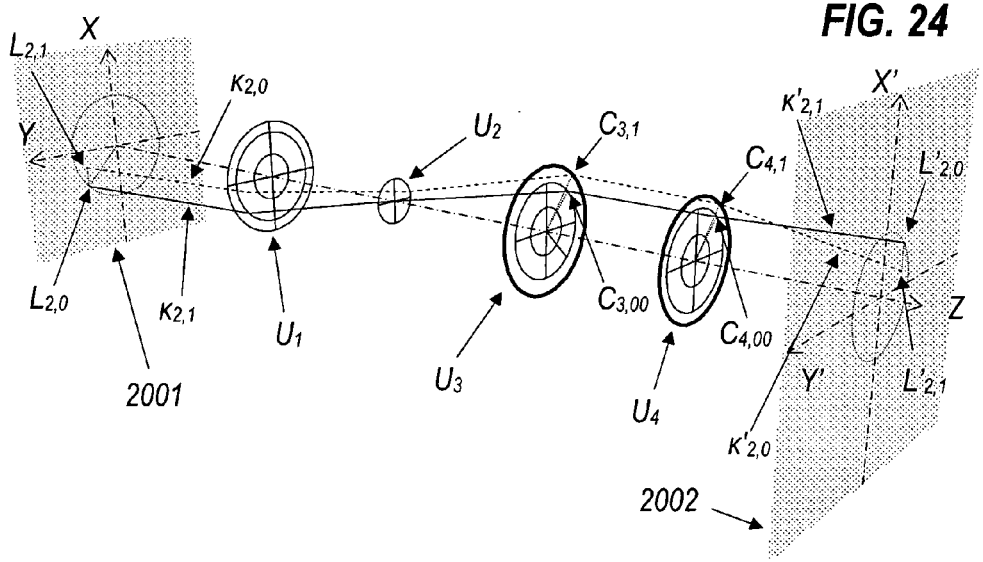

FIG. 24 shows the calculation of $U_{3,1}$ and $U_{4,1}$, the second portions of surfaces $U_3$ and $U_4$, respectively.

Let $K_{2,1}$ be a set of rays belonging to the bundle $K_2$ that are emitted from points between $L_{2,0}$ and $L_{2,1}$ and arrive at surface $U_3$ and surface $U_4$ after propagating through the $n_1$ initial surfaces 2003, $U_1$, $n_2$ intermediate surfaces 2004, $U_2$, and the $n_3$ intermediate surfaces 2005.

The points of $L_2$ from $L_{2,0}$ to $L_{2,1}$ are in a plane that is parallel to XZ plane at y=η.

The new portions $U_{3,1}$ and $U_{4,1}$ will be the skew imaging ovals between points $C_{3,0}$ and $C_{3,1}$ and between $C_{4,0}$ and $C_{4,1}$, respectively, that transform the rays of bundle $K_{2,1}$ emitted from points L(x, y, 0) in the range $[L_{2,0}, L_{2,1}]$ on the object plane 2001 onto rays belonging to another bundle $K'_{2,1}$ crossing the image plane 2002 at points L'(x', y', z') in the range $[L'_{2,0}, L'_{2,1}]$, fulfilling the requirement that x'=m·x and y'=m·y.

These imaging ovals are calculated as follows:

Let Δ be a differential increment. Let us consider an offset along the x axis relative to the point $L_{2,0}(x_{2,0}, η, 0)$, where η is the distance between XZ plane and the plane of the points that emit bundle $K_2$. The new point has the coordinates $L(x_{1,0}+Δ, η, 0)$, but we only are going to represent its projection onto plane XZ.

We now consider the cone coaxial with the optical axis of the system and tangent to the optical surface at point $C_{3,0}$. A ray emitted from point L propagates through the first $n_1$ surfaces 2003, $U_1$ and $U_2$, and the intermediate $n_2$ surfaces 2004 and $n_3$ surfaces 2005. It intersects the aforementioned cone tangent to the optical surface at point $C_{3,0}$ and defines point $C_3$. We choose a normal vector to surface $U_3$ at $C_3$ on the meridional plane through $C_3$.

Let us now consider the cone tangent to the optical surface at point $C_{4,0}$ (coaxial with the optical axis of the system as defined above). The ray deflected at $C_3$ propagates through intermediate $n_4$ surfaces 2006, intersects this cone and defines point $C_4$. The ray deflected at $C_4$ must cross the image plane 2002 at $L'(m(x_{2,0}+Δ), m η, 0)$. The direction of the incident and deflected rays at $C_4$ defines its normal. There is, however, no guarantee that this normal vector is perpendicular to a rotationally symmetric surface. We iterate the normal vector at $C_3$ until the normal vector at the new $C_4$ is also contained on a meridional plane (to ensure that the surfaces being generated have circular symmetry).

The propagation of this skew ray through the system then defines the normal vectors at both $C_3$ and $C_4$.

Figure 25:
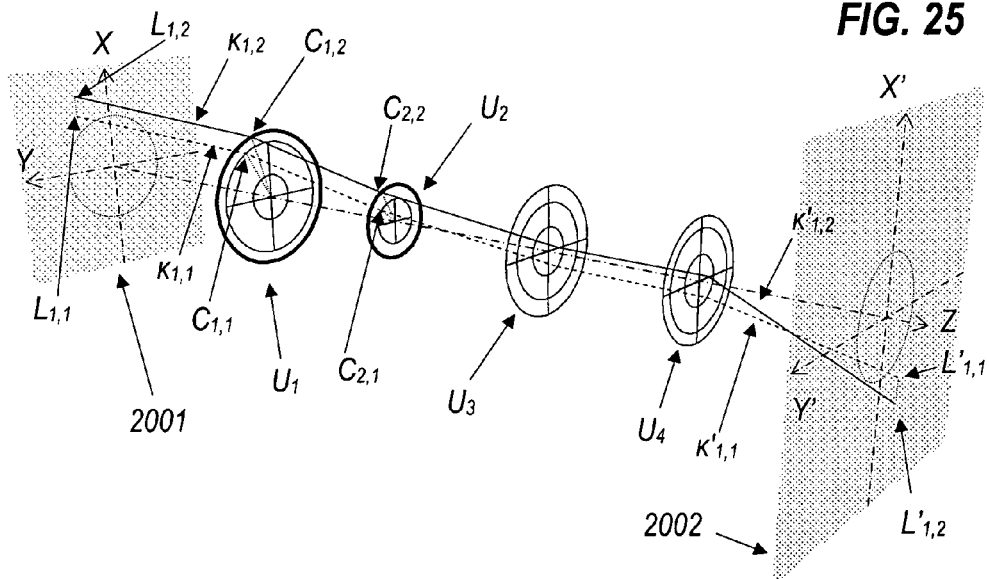

FIG. 25 shows the calculation of the next section $U_{1,2}$ of $U_1$ from $C_{1,1}$ to $C_{1,2}$ and the next section $U_{2,2}$ of $U_2$ from $C_{2,1}$ to $C_{2,2}$ with skew rays of the bundle $K_1$ in the range $[K_{1,1}, K_{1,2}]$ emanating from points of the object 2001 in the range $[L_{1,1}, L_{1,2}]$ and arriving as rays of the bundle $K'_1$ in the range $[K'_{1,1}, K'_{1,2}]$ at points of the image 2002 in the range $[L'_{1,1}, L'_{1,2}]$ in the same way that $U_{1,1}$ and $U_{2,1}$ were calculated with reference to FIG. 23.

Figure 26:
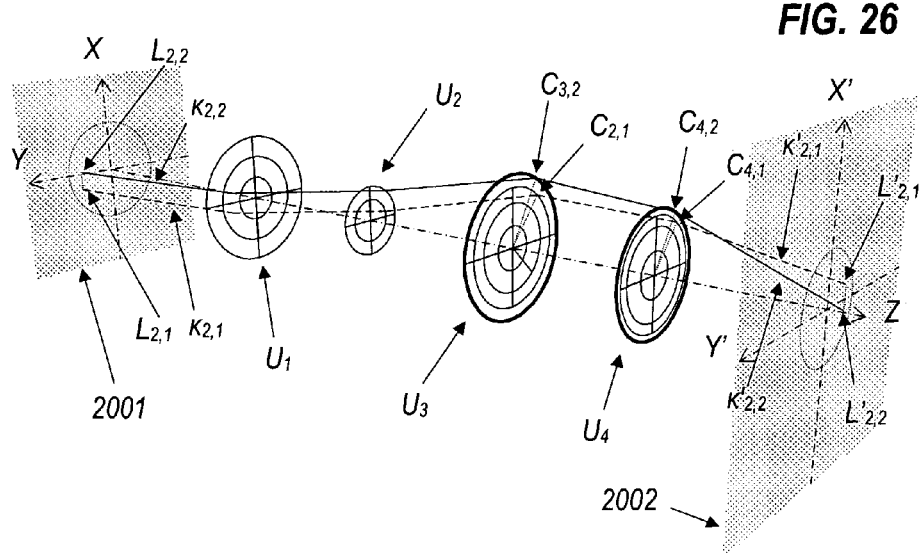

FIG. 26 shows the calculation of the next section $U_{3,2}$ of $U_3$ from $C_{3,1}$ to $C_{3,2}$ and the next section $U_{4,2}$ of $U_4$ from $C_{3,1}$ to $C_{3,2}$ with skew rays belonging to the bundle $K_2$ in the range $[K_{2,1}, K_{2,2}]$ emanating from points of the object 2001 in the range $[L_{2,1}, L_{2,2}]$ and arriving as rays of the bundle $K'_2$ in the range $[K'_{2,1}, K'_{2,2}]$ at points of the image 2002 in the range $[L'_{2,1}, L'_{2,2}]$ in the same way that $U_{3,1}$ and $U_{4,1}$ were calculated with reference to FIG. 24.

The process continues, calculating successively portions $U_{1,k}$, $U_{2,k}$, $U_{3,k}$ and $U_{4,k}$ according to FIGS. 25 and 26 for increasing k, until the design takes into account the whole available or necessary ranges of object points.

Figure 37:
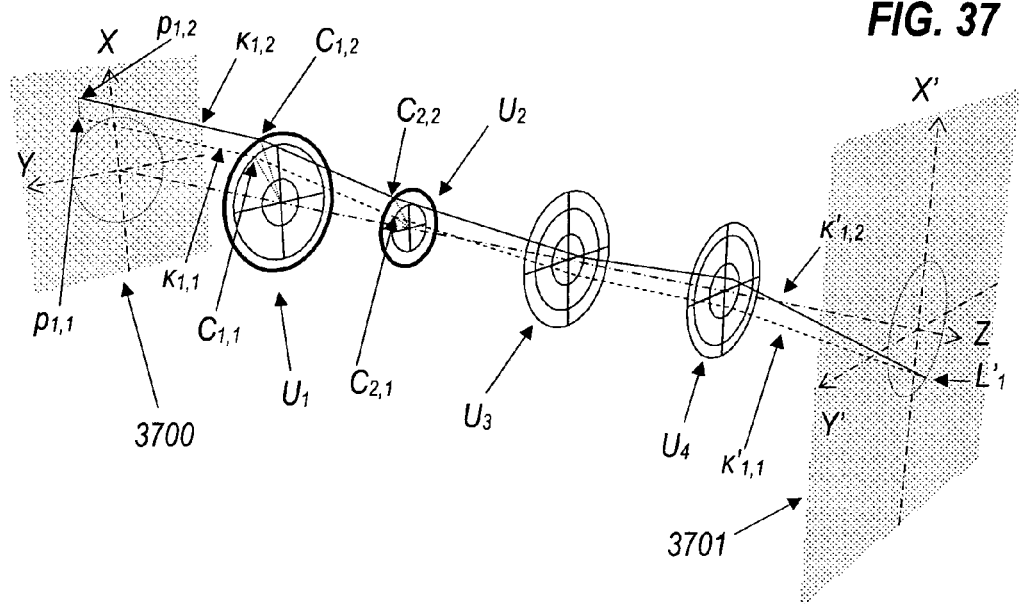
FIGS. 37 and 38 are ray diagrams similar to FIGS. 25 and 26, for an object discretization case analogous to the pupil discretization case of FIGS. 25 and 26.
Figure 38:
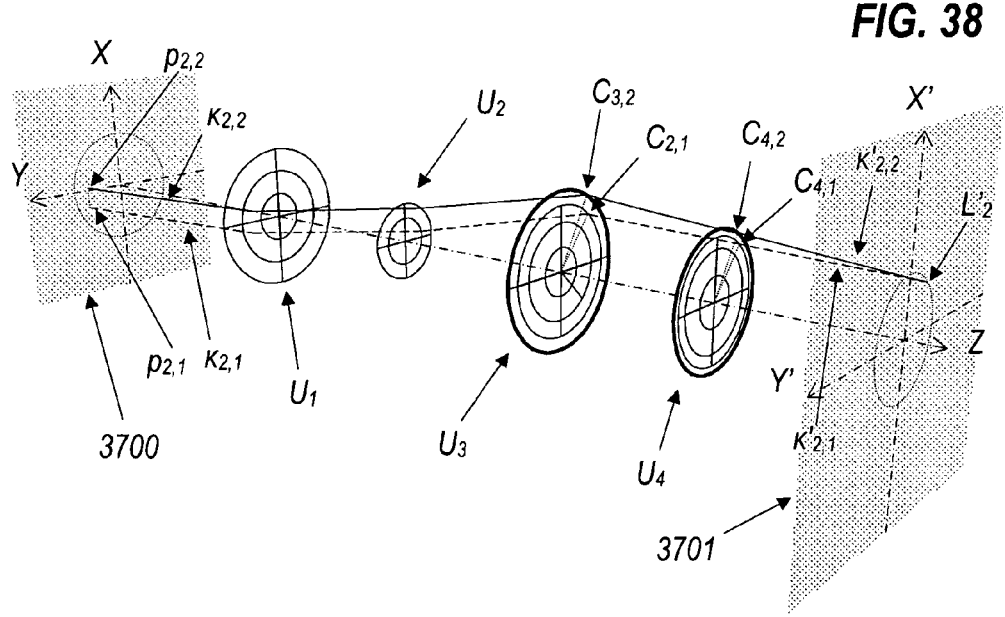

So far we have described the detailed steps for design method using the particular case of pupil discretization (in which the starting ray bundles are distributed fairly evenly across the entry pupil). The described design methods can be analogously applied to the general case and to the dual case of object discretization. As an example, FIGS. 37 and 38 show the object discretization ray diagrams equivalent to FIGS. 25 and 26 for the object discretization equivalent of the 4-surface design shown in FIGS. 6, 7, and 20 to 26. In this dual case, the object (instead of the pupil) is located at infinity, and the plane in which the starting points $p_{1,1}, p_{1,2}, p_{2,1}, p_{2,2}$, etc. are located is the pupil plane 3700 (instead of the object plane 2001). The four one-parameter input bundles are the same as those shown in FIG. 7. The four object points at infinity in FIGS. 37 and 38 are analogous to the four pupil points at infinity in FIGS. 25 and 26, given by the direction vectors $(±\sin(α_7)/\sqrt{2}, ±\sin(α_7)/\sqrt{2}, \cos(α_7))$, where $α_7$ is the angle formed by those rays with the optical axis, as shown in FIG. 6. The points $p_{1,1}, p_{1,2}, p_{2,1}, p_{2,2}$ on the pupil 3701 in FIGS. 37 and 38 are analogous to the four points $L_{1,1}, L_{1,2}, L_{2,1}, L_{2,2}$ on the object 2001 in FIGS. 25 and 26.

The only significant change when comparing the object discretization and pupil discretization cases relates to the rays arriving at the image plane. The image plane 3701 in FIGS. 37 and 38 is not the dual of the image plane 2002 in FIGS. 25 and 26, because both are at a finite distance. While in the pupil discretization case, the image points sweep image plane 2002, as points $L'_{1,1}$, $L'_{1,2}$, $L'_{2,1}$, $L'_{2,2}$ in FIGS. 25 and 26, in the object discretization case there are four fixed image points located at $(\pm f \cdot \sin(\alpha_7)/\sqrt{2}, \pm f \cdot \sin(\alpha_7)/\sqrt{2})$ on the image plane 3701, where parameter f is given and is the focal length of this system; equivalent to the magnification m as parameter of the pupil discretization case). Two of these four image points are labeled as $L'_1$, and $L'_2$ in FIGS. 37 and 38, respectively (the other two are symmetric to $L'_1$, and $L'_2$ with respect to the Y'=0 plane).

Figure 27A:
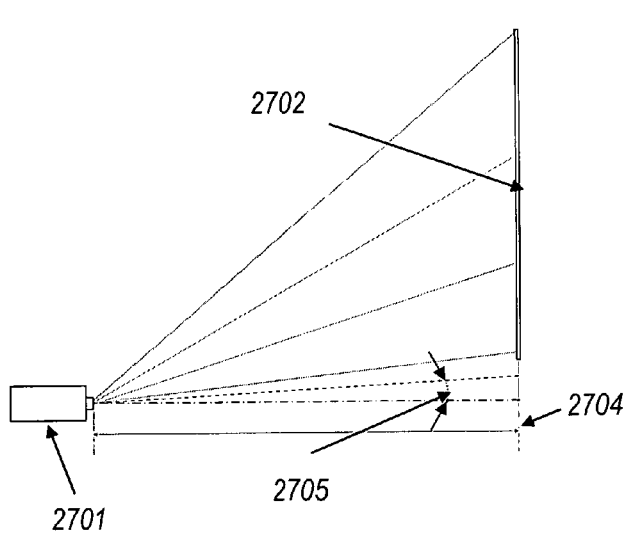
FIGS. 27A and 27B are a pair of diagrams comparing the overall dimensions of a projection system with and without an external optical device.
Figure 27B:
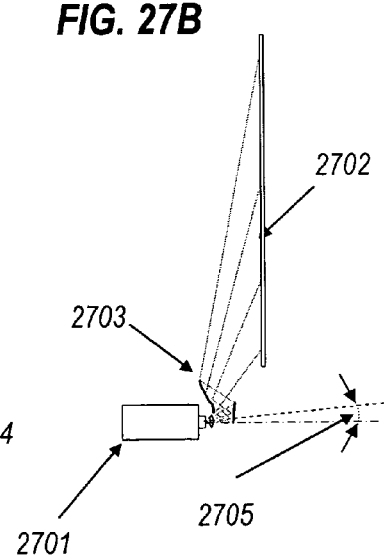

FIG. 27 shows the concept of an external optics 2703 that is added to a conventional projector 2701 to diminish drastically the distance 2704 between a screen 2702 and the projector 2701. As an example, the horizontal projection distance 2704 can be reduced to 20 to 40 cm for an 80" (2 meter) screen diagonal using the external optics. The angle between the optical axis of the mirrors 2703 and a line joining the upper edge of the secondary mirror 2703 to the upper edge of the screen 2702 can be in the 70-80° range. In general there may be an adjustable tilt 2705 between the axis perpendicular to the screen 2702 (which is significant if the projected image is to be rectangular and not trapezoidal) and the optical axis of the projector 2701.

Figure 28:
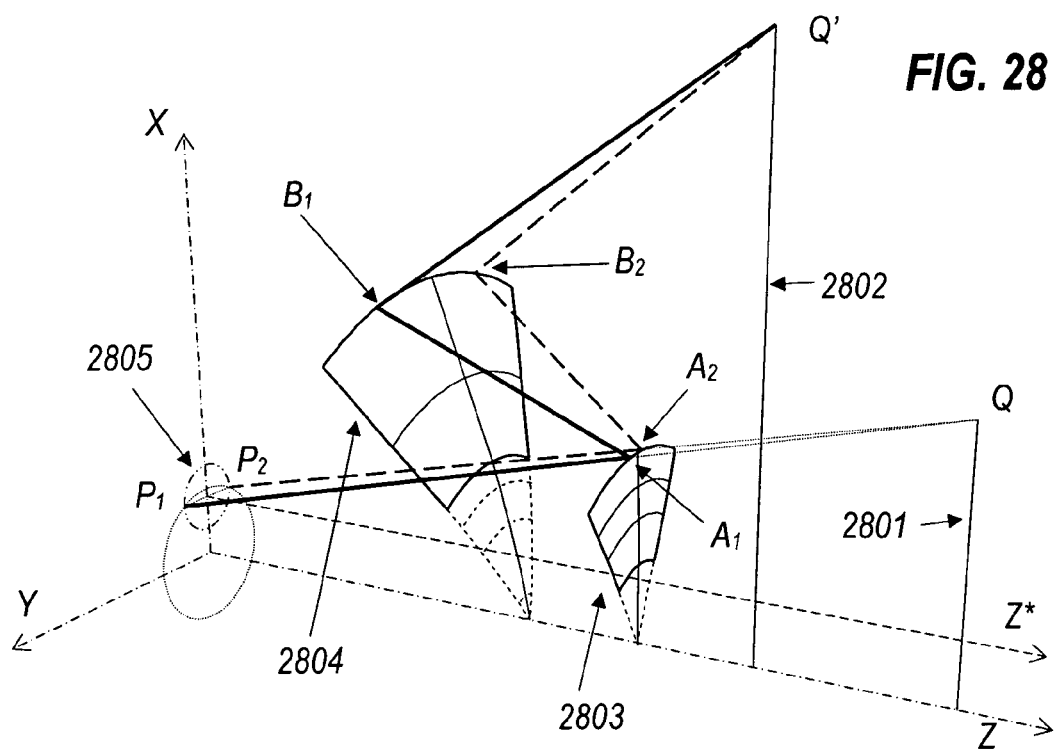
FIG. 28 is a ray diagram for an optical device suitable for the projection system of FIG. 27.

FIG. 28 shows a skew-ray diagram for one application of the embodiment of the SMS method according to FIGS. 8 to 12 to the design of two simultaneous surfaces (two convex mirrors) with decentered pupil and positive magnification.

The beam from physical source pupil 2805 with edge points at $P_1$ and $P_2$ corresponds to projector 2701 of FIG. 27, and is initially focused on virtual object 2801 with an edge point at Q, corresponding to the conventional screen 2702 at a distance 2704 from the projector in FIG. 27. (The pupil 2805 is decentered with respect to the optical system and the axis that passes through the center of the physical pupil 2805, denoted as Z*, is offset respect to the optical axis Z in FIG. 28). The beam is to be redirected onto image surface 2802, with an edge point at Q'. The surfaces of primary mirror 2803 and secondary mirror 2804 are built from skew bundles $N_1$ and $N_2$ (see FIG. 2) of rays leaving, respectively, from edge points $P_1$ and $P_2$ of source pupil 2805 in object plane XY.

An example of a design similar to the one shown in FIG. 28 is described in Table 1 using a high order polynomial fitting of the points obtained by the SMS. The first column is the position of the object 2801 in mm. The second, the fourth and the sixth columns show respectively the index of refraction between the object 2801 and the first surface 2803, the first 2803 and the second 2804 surfaces, and the second surface 2804 and the image 2802. The third and fifth columns show the type of surface. And finally the seventh column indicates the position of the image 2802 in mm.

TABLE 1

| Object z (mm) | $n_{01}$ | Surface #1 | $n_{12}$ | Surface #2 | $n_{23}$ | Image z (mm) |
|---|---|---|---|---|---|---|
| 733 | 1 | MIRROR | 1 | MIRROR | 1 | 370 |

The surfaces are rotationally symmetric. The polynomials that generate them are given by the following polynomial, where x and z are given in millimeters:

$$z = \sum_{i=0}^{14} a_i \cdot x^i$$

In this example the values of the coefficients $a_i$ are listed in Table 2.

TABLE 2

| Degree i | Surface #1 | Surface #2 |
|---|---|---|
| 0 | 131.6108353307360232 | −28.92989700863472535 |
| 1 | 0.0005127237074903107788 | 0.06857710589021033532 |
| 2 | −0.0005352638210571434044 | −0.010349585269051993913 |
| 3 | −1.997222796734076251e−05 | 0.0001093707495019956961 |
| 4 | 8.48719519915314703e−07 | −6.39749974850254855e−07 |
| 5 | −1.599362710865039617e−08 | 1.184371722756844219e−09 |
| 6 | 2.119409006307039654e−10 | 1.06747700491496561e−11 |
| 7 | −2.023697617472259993e−12 | −7.064060062186837446e−14 |
| 8 | 2.2934058075888859e−14 | −2.133187581670922473e−17 |
| 9 | −4.705528468502359841e−16 | 1.614369048414757805e−18 |
| 10 | 7.604570739846554718e−18 | −4.451690250255395547e−21 |
| 11 | −6.924121020563965706e−20 | −1.259209490743304772e−23 |
| 12 | 3.12412438980028417e−22 | 9.895557627573969438e−26 |
| 13 | −4.085423247898361372e−25 | −2.187999814680161284e−28 |
| 14 | −9.072042058390716408e−28 | 1.741236245302374085e−31 |

The range of the x-variable, in millimeters, is: Surface #1: X∈[24, 87], Surface #2: x∈[50, 258]

As another example, a 3 surface design similar to that described in FIG. 14, but applied for a lens-mirror combination, is described in Table 3. The first column is the position of the object 1301 in mm. The second, the fourth and the sixth and eighth columns show respectively the index of refraction between the object 1301 and the first surface $T_1$, the first $T_2$ and the second $T_3$ surfaces, the second $T_2$ and the third $T_3$ surfaces, and the third surface $T_3$ and the image 1302. The third, fifth and sixth columns show the type of surface. And finally the ninth column indicates the position of the image 1302 in mm.

TABLE 3

| Object z (mm) | $n_{01}$ | Surface #1 | $n_{12}$ | Surface #2 | $n_{23}$ | Surface #3 | $n_{3i}$ | Image z (mm) |
|---|---|---|---|---|---|---|---|---|
| 733 | 1 | REFRACTIVE | 1.492 | REFRACTIVE | 1 | MIRROR | 1 | 30 |

The surfaces are rotationally symmetric. The coefficients of the polynomials that describe them are listed in Table 4.

TABLE 4

| Degree i | Surface #1 | Surface #2 | Surface #3 |
|---|---|---|---|
| 0 | 3 | 3.5 | −20 |
| 1 | −3.334937924883048244e−05 | 1.409342126391967807e−06 | 3.261385252951022433e−06 |
| 2 | 0.00066848224053493591 | −0.001671959195526850125 | −0.01018108281968569187 |
| 3 | −0.006459343441054133522 | 0.0002278929947454659229 | 5.015766261787504123e−06 |
| 4 | 0.04215799898987670352 | 0.007496168216161020609 | 9.941701845189201598e−06 |
| 5 | −0.1021137349958092521 | 0.003572024536365797295 | 4.123728730366011129e−07 |
| 6 | 0.2092218661099297938 | −0.008330254865652886656 | −7.841978227018974598e−08 |
| 7 | −0.3000331809720833687 | 0.009808123572472253818 | 4.501968526516977962e−09 |
| 8 | 0.3013186420257574771 | −0.008998032920594860318 | −1.473343376384091687e−10 |
| 9 | −0.2149294056775047368 | 0.005783305004467486146 | 2.90958704221392483e−12 |
| 10 | 0.1084726552007362205 | −0.002524494217023021906 | −2.930923655847189003e−14 |
| 11 | −0.03785341827560828598 | 0.000737667541444016802 | −4.364913696842139444e−17 |
| 12 | 0.008685559855221973782 | −0.0001383654826593623684 | 5.071944245168303528e−18 |
| 13 | −0.001178685858514201632 | 1.502846408954331896e−05 | −5.684018522144236693e−20 |
| 14 | 7.167127423048289784e−05 | −7.147535688781744746e−07 | 2.226905474097116083e−22 |

Figure 29:
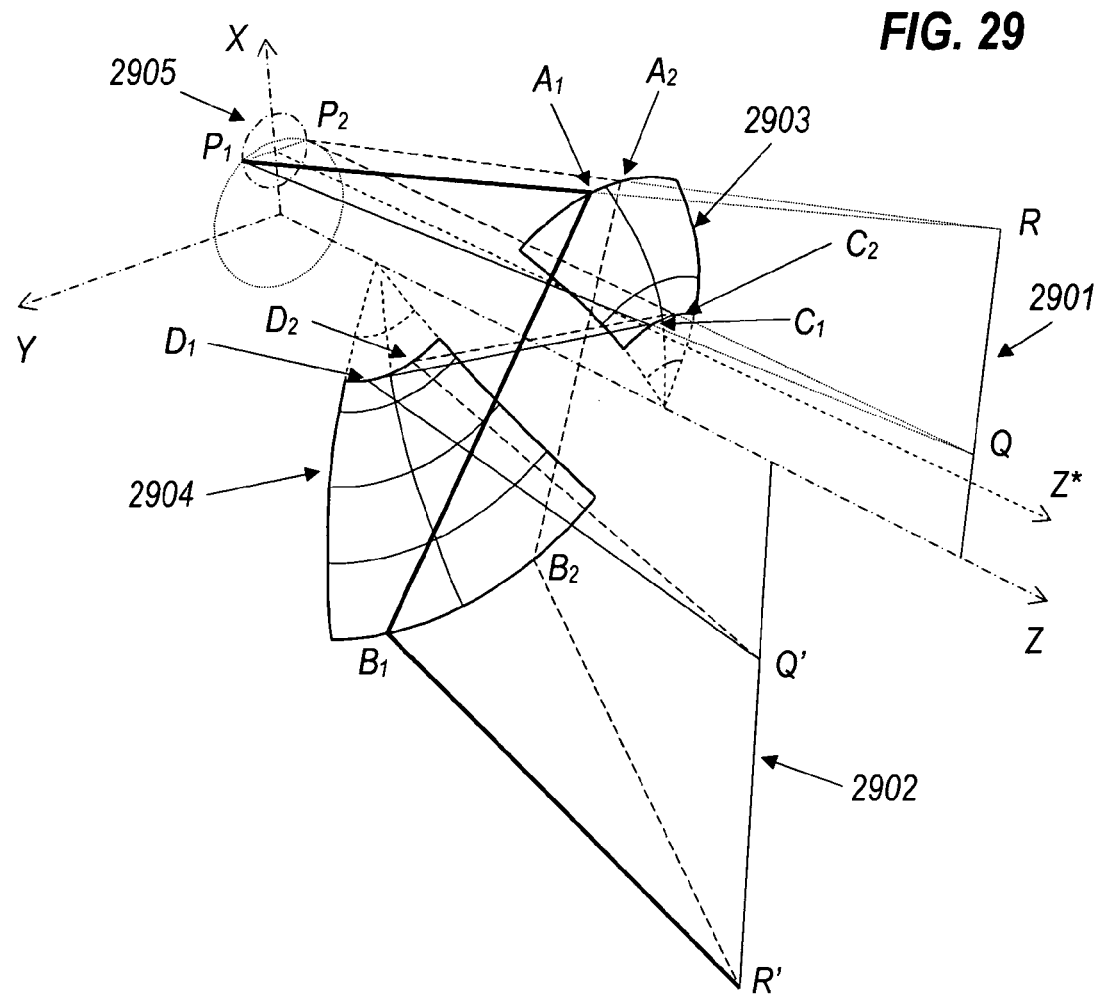
FIG. 29 is a ray diagram for an optical device with negative magnification suitable for the projection system of FIG. 27.

The range of the x-variable is: Surface #1: $x \in [0, 23]$, Surface #2: $x \in [0, 24]$, Surface #3: $x \in [55, 451]$ FIG. 29 shows a skew-ray diagram for an application of the embodiment of the SMS method according to FIGS. 8 to 12 to the design of two simultaneous surfaces (two concave mirrors) with decentered pupil and negative magnification.

Figure 30A:
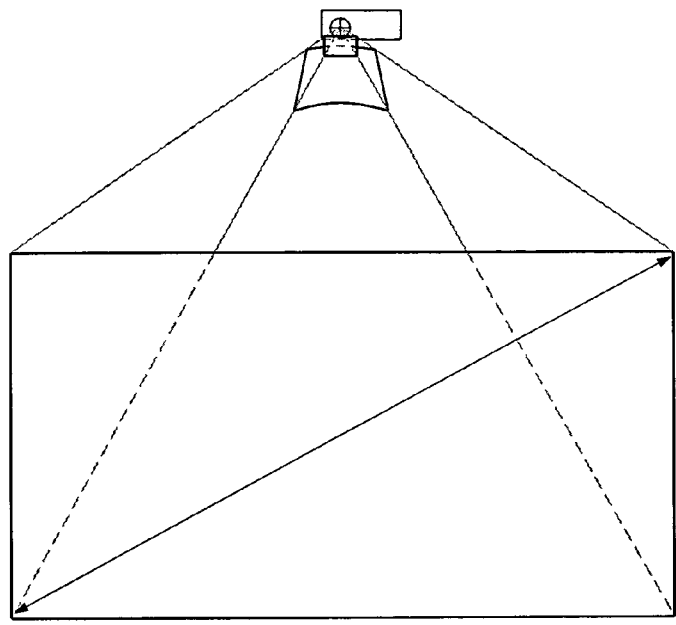
FIGS. 30A, 30B, and 30C are front, side, and perspective views showing the relative position and dimensions of components of a projection system similar to that shown in FIG. 28.
Figure 30B:
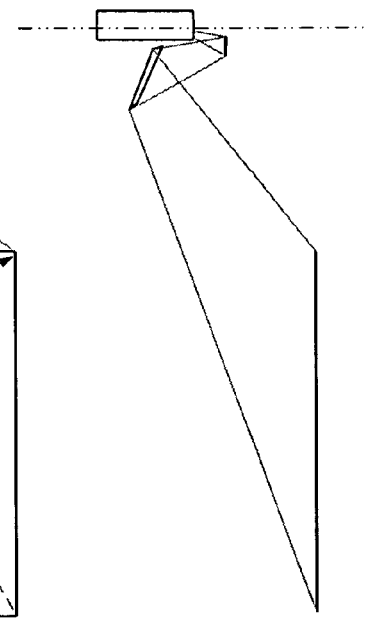

FIG. 30A and FIG. 30B show respectively the front and side view of an optical system consisting of a projector suspended from the ceiling that illuminates a screen at a short throw-distance and the external optics generated as in FIG. 28.

Figure 30C:
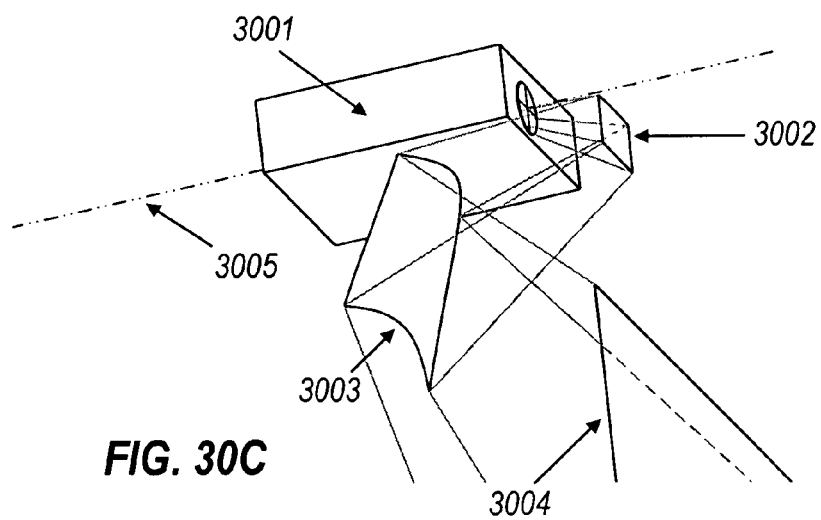

FIG. 30C shows the optical system and projector 3001 of FIG. 30A and FIG. 30B after the primary mirror 3002 and the secondary mirror 3003 have been shaped, omitting the parts that are not in the beam path from the projector pupil to the screen 3004. The mirrors 3002, 3003 are shown "in air" with the holders in which the two mirrors are mounted omitted in the interests of clarity. The holders may be of conventional construction, and it is within the ordinary skill in the art to design and construct suitable holders once the shapes and positions of the mirrors have been determined.

Figure 31:
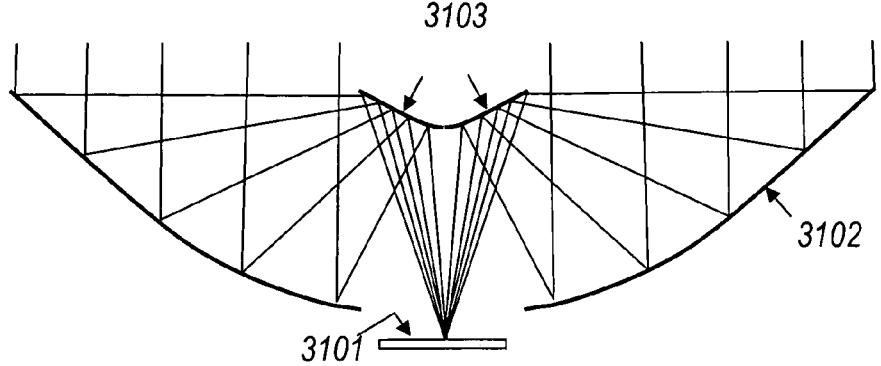
FIGS. 31 to 35 are ray diagrams of optical devices using reflective surfaces.

FIG. 31 shows an XX on-axis device of Cassegrain configuration, using a concave primary mirror 3102 and a convex secondary mirror 3103 to focus light from a distant object [not shown] onto an image plane 3101. One application for the configuration of FIG. 31 is a compact objective with large focal length. A similar compact configuration has previously been considered in another field of use (solar applications), (Gordon, Feuermann, "Optical performance at the thermodynamic limit with tailored imaging designs", Applied Optics, 2005), with the profiles calculated as the Schwarzschild two-mirror aplanatic. Its application to imaging as a highly compact objective, making it nonaplanatic but optimized as calculated with the method described herein (which is a superior strategy, as was proven for another device but related design strategy in the above-mentioned paper of Benítez and Miñano, "Ultrahigh-numerical-aperture imaging concentrator", JOSA A, 14, pp. 1988-1997, (1997)) make it different to those disclosed in ref D. Lynden-Bell, *Exact optics: a unification of optical telescope design*, Mon. Not. R. Astron. Soc. 334, 787-796 (2002)

Figure 32:
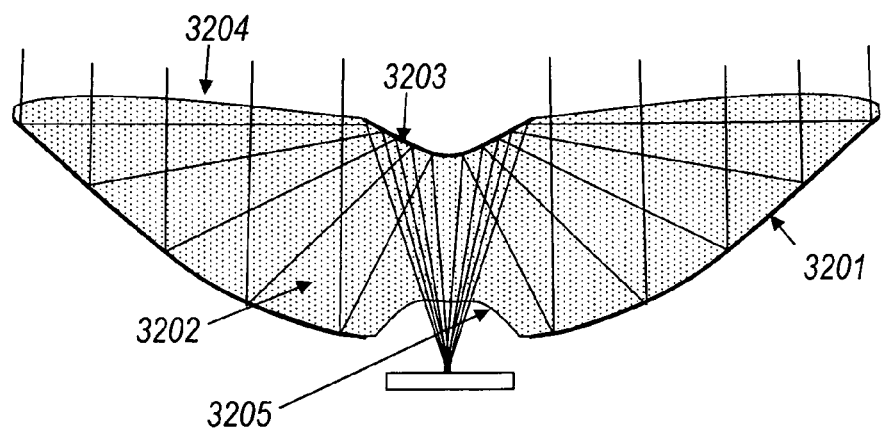

FIG. 32 shows an RXXR on-axis device. The general configuration of the device is similar to FIG. 31, but the region between the primary mirror 3201 and the secondary mirror 3203 is filled by a material 3202 of refractive index substantially greater than 1. Thus, light from the distant object [not shown] enters through a refractive surface 3104 and exits through a refractive surface 3105. One application for this device is as a compact device with large focal length.

The monochromatic performance of the XX can be much improved if more aspheric surfaces are added. This is the case of the RXXR device, which can be designed with the methods described herein, for instance, using 2-skew rays. This general case is shown.

The four surfaces of the RXXR can also be designed with three rays, one of them being the on-axis ray, and designing with the optical path length condition for the 3 rays and the Conrady condition for the central ray (since the path length inside the dielectric is equal for all the on-axis rays.

Figure 33:
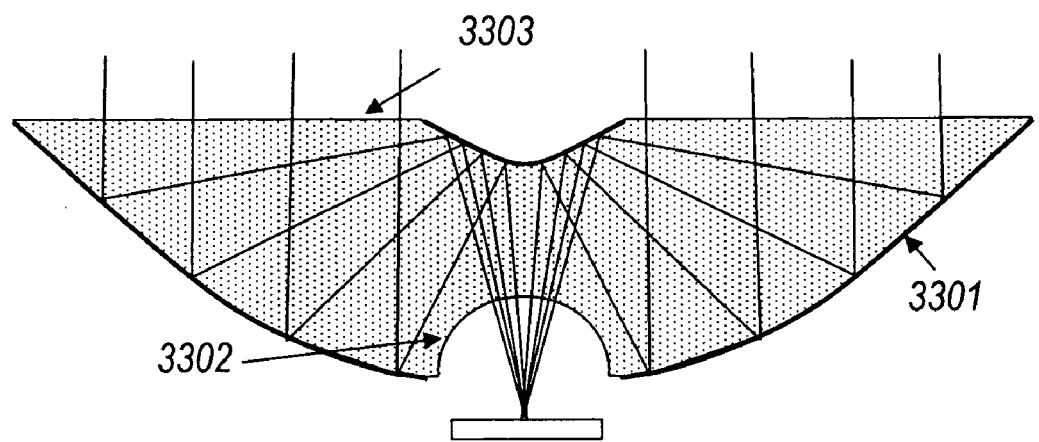

FIG. 33 shows a particular case of FIG. 32 in which only 2 or 3 of the surfaces of the primary mirror 3301, secondary mirror, refractive entry surface 3303, and refractive exit surface 3302 are designed, and the others prescribed.

If the entry surface 3303 is restricted to be a flat and the exit surface 3302 to be a sphere centered at the on-axis image point, the system will fulfill the Conrady condition of achromatism for the on-axis point. For a finite field of view, achromatism can be improved if instead of a sphere as exit surface an ellipse with its two foci on the image plane is prescribed.

Figure 34:
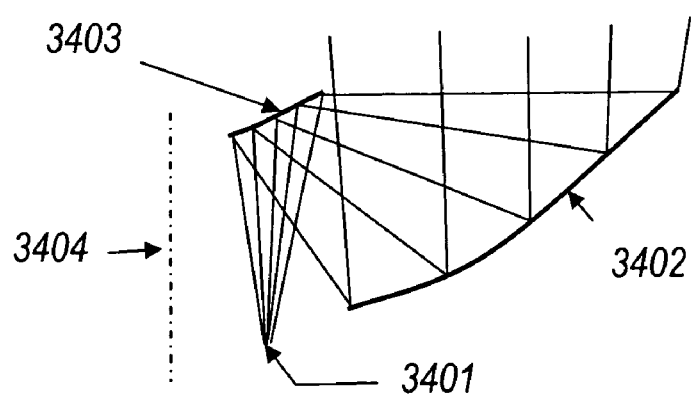

FIG. 34 shows an off-axis XX device using primary mirror 3402 and secondary mirror 3403, one application of which is as an afocal telescope with the eye as aperture stop 3401. Optical axis 3404 is shown. It has been designed with the methods described herein. This configuration is novel and the profiles obtained with the methods disclosed in this application give better performance than the traditional aplanatic designs referenced in R. V. Willstrop and D. Lynden-Bell, *Exact optics. II. Exploration of designs on-and off-axis*, Mon. Not. R. Astron. Soc. 342, 33-49 (2003), as was proven for another device but related design strategy in Benítez and Miñano, *Ultrahigh-numerical-aperture imaging concentrator*, JOSA A, 14, 1988-1997, (1997).

Figure 35:
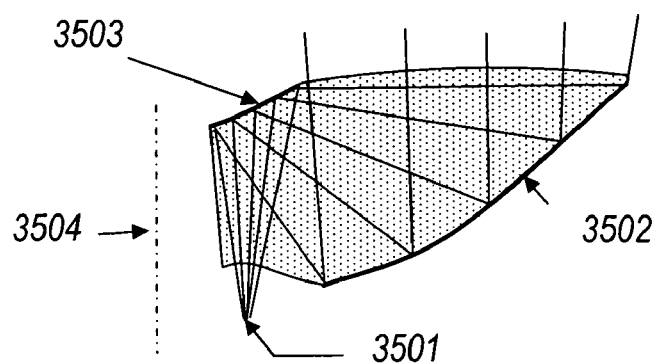

FIG. 35 shows the 4-surface higher performance RXXR version of the off-axis afocal ocular, with refractive entry surface, concave primary reflector 3502, convex secondary reflector 3503, and refractive exit surface focusing light from a distant object on an image 3501, all on one side of the optical axis 3504.

Figure 36B:
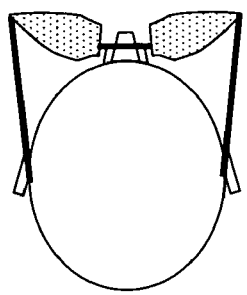
FIGS. 36A and 36B are a top and front view of a wearable optical device.
Figure 36A:
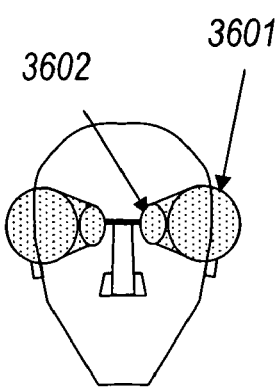

FIG. 36 shows an application of two of the devices shown in FIG. 35 as a pair of binoculars or head mounted displays with entry surfaces 3601 larger and further apart than the exit surfaces 3602. FIG. 36A shows the front view of the system and FIG. 36B shows the top view.

Figure 39A:
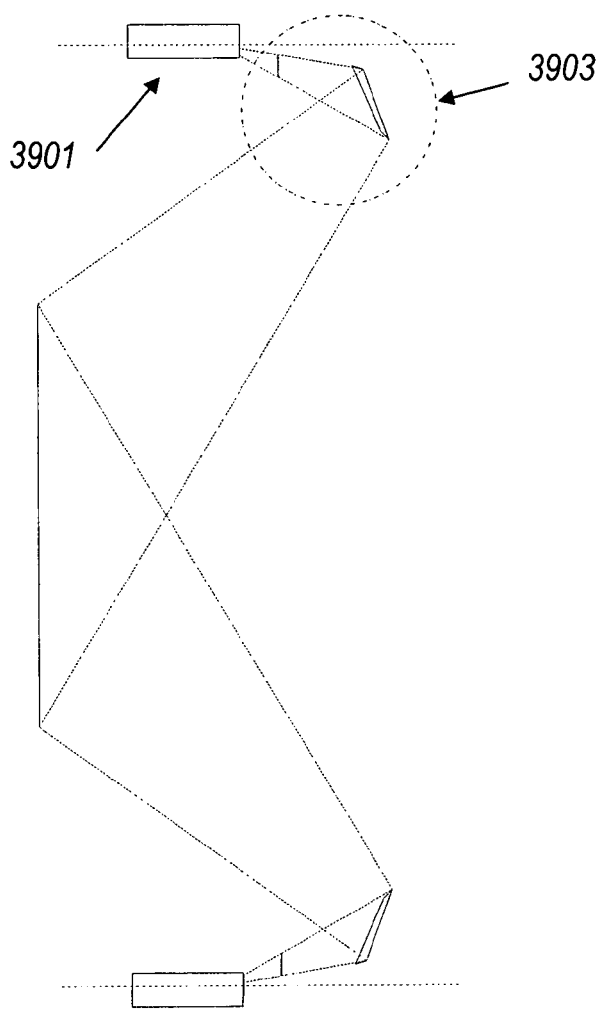
FIG. 39A is a side view of an embodiment of a two-projector system using RRX optics.
Figure 39B:
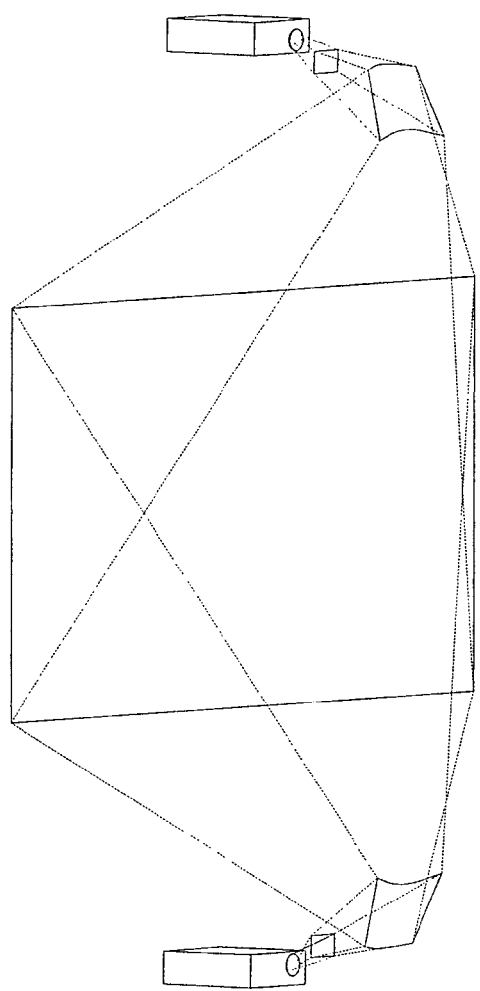
FIG. 39B is a front view of the system of FIG. 39A.

FIGS. 39A through 39D (collectively FIG. 39) show the concept of an external optics 3903 that is added to a pair of conventional projectors 3901 used in a stereoscopic "Virtual Reality" system. Two different arrangements of projectors are shown. In FIGS. 39A and 39B the projectors 3901 are positioned on opposite sides of the projection screen, one on the floor and the other on the ceiling. In FIGS. 39C and 39D, the two projectors 3901 are positioned side by side on the same side of the screen. Both arrangements have the same external optics for each projector, and high compactness. There are practical differences between the two configurations. The system of FIG. 39A needs projectors to be placed at both floor and ceiling (or at both left and right side walls) but FIG. 39C needs projectors at only one of the floor, ceiling, or wall. Installation of the system is thus easier in FIG. 39C. The system of FIG. 39A can project images from the two projectors that overlap on the screen at 100% but in FIG. 39C the images do not fully overlap and there will be two stripes at the flanks that are covered by only one projector, so the area of stereoscopic projection is smaller than the area of projection of each projector.

Figure 40:
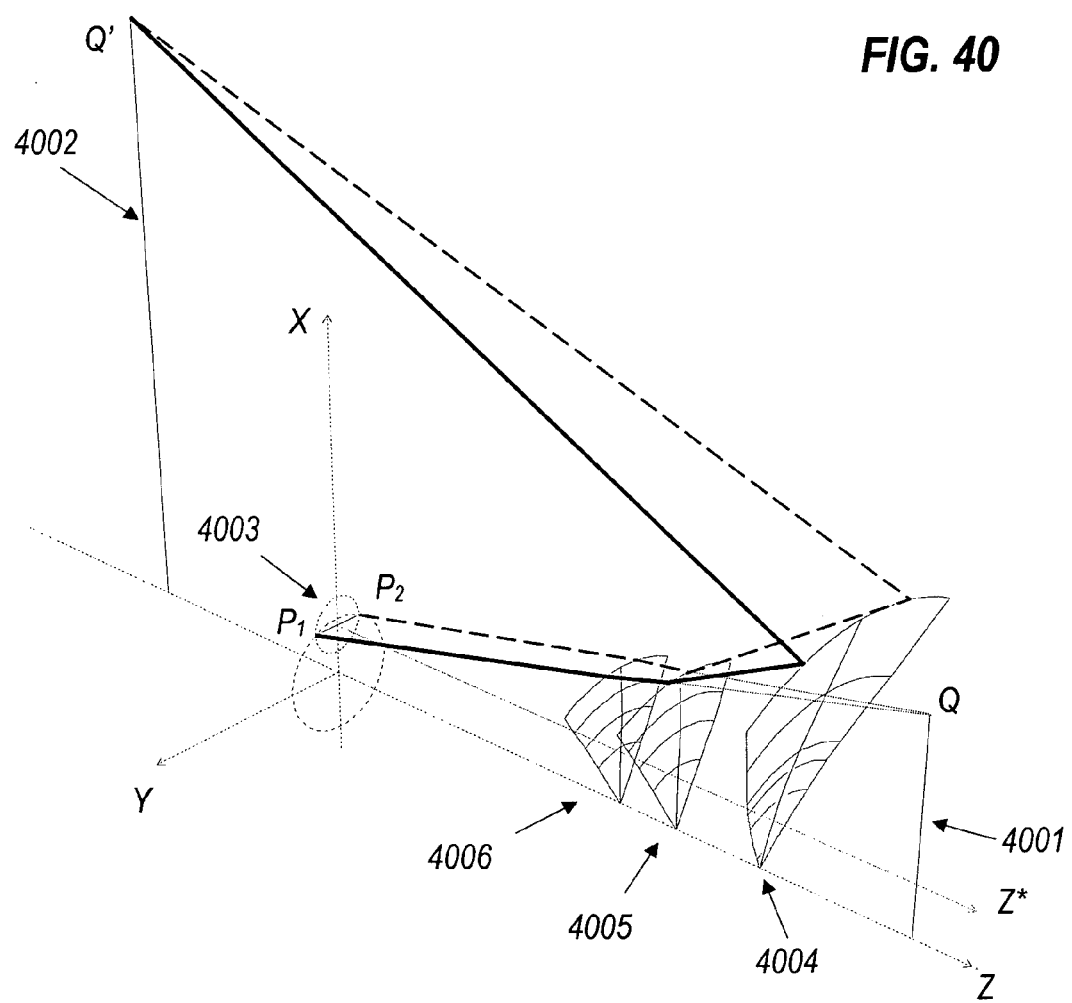
FIG. 40 is a ray diagram for an RRX device such as those shown in FIGS. 39A to 39D.

FIG. 40 shows a skew-ray diagram for one application of the embodiment of the SMS method according to FIGS. 8 to 12 to the design of two simultaneous surfaces with decentered pupil and positive magnification. In this example, the simultaneous surfaces are a convex mirror 4004 and one of the two surfaces 4005 of a lens. The other surface 4006 of the lens is a prescribed spherical surface.

The physical source pupil 4003 corresponds to one of the projectors 3901 of FIG. 39, and lies in the XY plane, with edge points at $P_1$ and $P_2$. The beam from physical source pupil 4003 is initially focused on a notional image position 4001 with an edge point at Q, analogous to the position of the conventional screen 2702 in FIG. 27A, which becomes a virtual object for the subsequent optics. (The pupil 4003 is decentered with respect to the optical system and the axis that passes through the center of the physical pupil 4003, denoted as Z*, is offset with respect to the optical axis Z in FIG. 40). The beam is to be redirected onto image surface 4002, with an edge point at Q'. The lens surface 4005 and mirror 4004 are built from skew bundles $N_1$ and $N_2$ (see FIG. 2) of rays leaving, respectively, from edge points $P_1$ and $P_2$ of source pupil 4003 in object plane XY.

An example of a design similar to the one shown in FIG. 40 is described in Table 5 using a high order polynomial fitting of the points obtained by the SMS. The first column is the z-coordinate position of the virtual object 4001. In this example, all dimensions are in mm. However, the system may of course be scaled to a larger or smaller size by denominating the dimensions consistently in some other unit, as may the optical systems detailed in Tables 1 to 4. The third, fifth and seventh columns show the type of each of the optical surfaces 4006, 4005, 4004 respectively. And finally the ninth column indicates the z-coordinate position of the image 4002. Each of the second, fourth, sixth, and eighth columns shows the index of refraction between the two elements in the adjacent columns, respectively the index of refraction between the object 4001 and the first surface 4006, between the first surface 4006 and the second surface 4005, between the second surface 4005 and the third surface 4004, and between the third surface 4004 and the image 4002.

TABLE 5

| Object 4001 z (mm) | $n_{01}$ | Surface #1 4006 | $n_{12}$ | Surface #2 4005 | $n_{23}$ | Surface #3 4004 | $n_{3i}$ | Image 4002 z (mm) |
|---|---|---|---|---|---|---|---|---|
| 492 | 1 | REFRACTIVE | 1.492 | REFRACTIVE | 1 | MIRROR | 1 | −2050 |

The surfaces are rotationally symmetric about the Z axis. Surface #1 (4006) is spherical, with radius=−205 mm, centre at z=−105 mm (so that the curve of surface #1, if extended, would cross the Z axis at z=+100 mm). The polynomials that generate surfaces #2 and #3 are given by the following polynomial, where x and z are given in millimeters:

$$z = \sum_{i=0}^{14} a_i \cdot x^i$$

In this example the values of the coefficients $a_i$ are listed in Table 6.

TABLE 6

| Degree i | Surface #2 | Surface #3 |
|---|---|---|
| 0 | 105 | 449.998979724719 |
| 1 | −3.30850955809314E−07 | −8.23316358105973E−07 |
| 2 | −1.74486196395850E−03 | 1.10159474043759E−03 |
| 3 | −1.14249190025329E−08 | −9.93203225278723E−09 |
| 4 | 6.19696390872513E−08 | −1.24563744602679E−08 |
| 5 | −2.26757033238732E−11 | −8.44497369126782E−12 |
| 6 | −4.54355425627722E−13 | 3.65738343764635E−13 |
| 7 | −1.63322009917833E−15 | −6.79809891158715E−16 |
| 8 | −7.72566512833314E−17 | −7.44728095435436E−18 |
| 9 | 4.69093856070439E−19 | 4.36576980634877E−20 |
| 10 | 0 | −2.50319830716945E−23 |
| 11 | 0 | −6.24148472409009E−25 |
| 12 | 0 | 3.01578609740332E−27 |
| 13 | 0 | −6.79327908712610E−30 |
| 14 | 0 | 7.96084277094057E−33 |
| 15 | 0 | −3.92328829426611E−36 |

The range of the x-variable is: Surface #1: x∈[14, 80], Surface #2: x∈[14, 80], Surface #3: x∈[53, 300]

FIG. 41A, FIG. 41B, and FIG. 41C show respectively the side, front, and perspective views of an embodiment of an optical sub-system consisting of a projector 4101 that is designed to illuminate a screen directly at a short throw-distance and the external optics generated as in FIG. 39.

In the interests of clarity and simplicity, the mirror 4103 (corresponding to surface 4004) and lens 4104 (corresponding to surfaces 4005, 4006) are shown "in air" with the holders in which the lens and mirror are mounted omitted. The holders may be of conventional construction, and it is within the ordinary skill in the art to design and construct suitable holders once the shapes and positions of the optical components have been determined. The projector axis Z* is shown as a dashed line in FIGS. 41A, 41C.

Although specific embodiments have been described, the skilled reader will understand how features of different embodiments may be combined and substituted, and such combinations are within the scope of the present invention.

For example, although the embodiments have been described with reference to light rays propagating in a specific direction, for example, left to right in FIGS. 1 to 30 or top to bottom in FIGS. 31 to 35, as with most non-dispersive optical devices the direction of propagation of the light rays can be reversed. Thus, the devices of FIGS. 31 to 35 could be used as projectors, with a light source at 3101, etc. and a projection beam radiating from the top of the device as shown.

Although in the interests of clarity the described process embodiments are shown in FIGS. 1 to 26 as being applied to refractive systems, so that the rays proceed monotonically from left to right and do not double back, as is shown in FIG. 28 and FIG. 29 the calculations can be applied equally well to reflective systems, including systems using total internal reflection at a refractive surface. The application to surfaces other than a simple refractive or reflective surface, including the faceted devices described in commonly-assigned U.S. Pat. No. 6,639,733, is also possible.

Although in the methods of construction shown in FIGS. 1 to 26 specific optical surfaces were "seeded" with initial points or surface sections, the use of the methods of these embodiments is not limited to the specific order of the optical surfaces shown. The choice of which of two or more surfaces are to be started with seed lines and/or seed sections, and which are to be wholly constructed, is made by the user of the method to suit the conditions of a specific implementation.

Processes with two, three, and four optical surfaces to be calculated have been described. There is in principle no limit to the number of surfaces that can be calculated, provided a sufficient number of bundles of rays (one pair of skew bundles for two surfaces, and optionally a meridional bundle for one surface) are used. However, the complexity of the calculation, and the risk that the calculation fails and must be restarted choosing different initial values, increases with the number of surfaces. Moderation is therefore presently recommended.

As may be seen by comparing FIGS. 1 to 26 with FIGS. 27 to 36, although the methods described rely on the simplifying assumption that the optical system is circularly symmetric about a central axis, an asymmetrical system may be designed by using only an off-axis portion of the calculated symmetric system. As mentioned with reference to FIG. 8, some of the skew bundle processes generate an optical surface with an undetermined central area, and with suitable selection of the initial conditions for an off-axis system, it may be unnecessary to calculate the central area.

Where the processes described in the embodiments start from points, line sections, or other constraints that are decided before the described calculation starts, described by terms such as "chosen," "defined," "known," "prescribed," or "predetermined," those constraints may be dictated by existing considerations, or freely chosen by the user of the process as an initial or preliminary step, or may be a mixture.

The above examples have been described with calculations starting from known ray bundles at the "object" plane, and proceeding to derive initially unknown ray bundles at the "image" plane, implicitly assuming that the actual photons propagate from object to image. However, in some circumstances the actual image may be initially better constrained than the actual object, and because of the reversibility of non-diffusive optics the described methods may be applied proceeding against the direction of photon flow. It is also contemplated that rays may be traced in both directions. However, that may render the calculations more complicated without compensating advantage, and bidirectional tracing is presently not preferred.

The preceding description of the presently contemplated best mode of practicing the invention is not to be taken in a limiting sense, but is made merely for the purpose of describing the general principles of the invention. The full scope of the invention should be determined with reference to the Claims.

We claim:

1. A method of calculating an optical surface, comprising calculating a meridional optical line of the surface by a method comprising repeatedly:
    selecting a ray passing a known point defining an end of a part of the optical line already calculated;
    extrapolating the optical line from the known point to meet the ray using a polynomial with at least one degree of freedom;
    adjusting the polynomial as necessary so that the selected ray is deflected at the extrapolated optical line to a desired target point;
    adding the polynomial to the optical line up to the point where the selected ray is deflected; and
    using said point where the selected ray is deflected as the known point in the next repetition.

2. A method according to claim 1, wherein the polynomial is a quadratic and is constrained so that the optical line and its first derivative are continuous at the known point.

3. A method according to claim 1, which is a method of calculating an optical surface for imaging optics, comprising tracing the ray from an object point on an object line to an image point on an image line onto which said object point is to be imaged.

4. A method according to claim 1, comprising tracing the ray through one or more other, known optical lines.

5. A method according to claim 1, comprising calculating sections of each of at least two optical lines in cyclical order using rays traceable through a most recently calculated section of the other optical line.

6. A method according to claim 1, comprising generating an optical surface by rotating the calculated optical line around an axis.

7. A method according to claim 1, comprising manufacturing an optical device having the calculated optical surface.

8. The method according to claim 1, comprising:
    selecting the ray bundles for the design so each ray bundles departs from a single different point of the object in Cartesian coordinates.

9. The method according to claim 1, comprising:
    selecting the ray bundles for the design so the rays of each ray bundle depart from a single object point of the object pointing towards points of the pupil of the form ($\zeta$, $y_0$, $z_{pupil}$) in Cartesian coordinates, where within each bundle $y_0$ is fixed and $\zeta$ varies.

10. A method of calculating first and second circularly symmetrical optical surfaces centered on an optical axis, comprising repeatedly:

selecting a skew ray passing a part of the first optical surface already calculated;

extrapolating the first optical surface to meet the ray at a first point;

selecting a surface direction for the extrapolated first optical surface at the first point having a normal in a meridional plane;

continuing the skew ray, deflected as implied by the selected normal, to a second point on the second optical surface, extrapolated as necessary;

finding a surface direction at the second point so that the selected ray is deflected at the second point to a desired target point;

adjusting the surface direction at the first point as necessary so that the normal to the surface direction at the second point is in a meridional plane;

adding the extrapolated parts as far as the first and second points to the first and second optical surfaces with the determined surface directions; and using said added parts as the known parts in the next repetition.

11. A method according to claim 10, wherein extrapolating the first or second optical surface comprises constructing a cone coaxial with the optical surface in question and tangential to the optical surface at the first or second point from the previous repetition.

12. A method according to claim 10, which is a method of calculating an optical surface for imaging optics, comprising tracing the ray from an object point on an object line to an image point on an image line onto which said object point is to be imaged.

13. A method according to claim 10, comprising tracing the ray through one or more other, known optical surfaces.

14. A method according to claim 10, comprising manufacturing an optical device having the calculated optical surface.

15. A method of designing a plurality N of optical surfaces of an optical system without requiring subsequent optimization methods, wherein the N optical surfaces are aspheric surfaces of rotation without restriction on their asphericity, comprising:

simultaneously calculating the N surfaces point-by-point;

using N uniparametric ray bundles previously selected at a starting position of the system; and applying the condition that the N uniparametric ray bundles are imaged without ray-aberration;

comprising selecting the uniparametric ray bundles at the starting position, wherein selecting the ray bundles comprises assessing how completely the selected ray bundles span the volume in the r-$\rho$-$\phi$ spatial-angular phase space defined by the object and the entry pupil.

16. The method according to claim 15, wherein the optical system is designed to image an object onto an image, the starting position is one of the object and the image, and the condition that the N uniparametric ray bundles are imaged without ray-aberration applies at the other of the object and the image.

17. The method according to claim 15, comprising selecting the uniparametric ray bundles at the starting position, wherein selecting the ray bundles comprises assessing how evenly the selected bundles are spaced apart in increments of ds, where $ds^2 = dr^2 + d\rho^2 + \rho^2 d\phi^2$.

18. The method according to claim 15, comprising:

selecting the ray bundles for the design so each ray bundle points towards a single different point of the pupil in Cartesian coordinates.

19. The method according to claim 15, comprising:

selecting the ray bundles for the design so each ray bundle passes through object points of the form $(\zeta, y_o, 0)$ in Cartesian coordinates, where $y_o$ is fixed within each bundle and $\zeta$ varies, and pointing towards a fixed point of the pupil.

* * * * *